United States Patent [19]

Staib et al.

[11] Patent Number: 5,204,872
[45] Date of Patent: Apr. 20, 1993

[54] CONTROL SYSTEM FOR ELECTRIC ARC FURNACE

[75] Inventors: William E. Staib; Robert B. Staib, both of Davenport, Iowa

[73] Assignee: Milltech-HOH, Inc., Davenport, Iowa

[21] Appl. No.: 685,629

[22] Filed: Apr. 15, 1991

[51] Int. Cl.[5] .................................. H05B 7/148
[52] U.S. Cl. ................................ 373/104; 373/102; 373/105; 373/106; 373/107; 307/201; 364/807; 364/551.01; 395/21
[58] Field of Search ............... 373/104, 102, 105, 106, 373/107, 108, 47, 49, 50; 364/513, 807; 307/201

[56] References Cited

U.S. PATENT DOCUMENTS

| | | | |
|---|---|---|---|
| 3,597,518 | 8/1971 | Roberts | 373/104 |
| 3,662,075 | 5/1972 | Sakai et al. | 373/105 |
| 3,767,832 | 10/1973 | Bennett | 373/105 |
| 3,950,733 | 4/1976 | Cooper et al. | 340/172.5 |
| 4,029,888 | 6/1977 | Roberts et al. | 373/104 |
| 4,044,243 | 8/1977 | Cooper et al. | 395/20 |
| 4,075,414 | 2/1978 | Thomas | 373/105 |
| 4,096,344 | 6/1978 | Munson | 373/105 |
| 4,254,474 | 3/1981 | Cooper et al. | 364/900 |
| 4,320,245 | 3/1982 | Gaydon et al. | 373/104 |
| 4,324,944 | 4/1982 | Weihrich et al. | 373/105 |
| 4,349,912 | 9/1982 | Bello | 373/105 |
| 4,607,373 | 8/1986 | Bergman | 373/104 |
| 4,620,308 | 10/1986 | Persson et al. | 373/105 |
| 4,663,764 | 5/1987 | Bretthauer et al. | 373/104 |
| 4,677,643 | 6/1987 | Dicks | 373/105 |
| 4,683,577 | 7/1987 | Bretthauer et al. | 373/105 |
| 4,701,932 | 10/1987 | Bretthauer et al. | 373/104 |
| 4,866,645 | 9/1989 | Lish | 364/602 |
| 4,873,455 | 10/1989 | de Chambost et al. | 307/201 |
| 4,873,661 | 10/1989 | Tsividis | 364/807 |
| 4,874,963 | 10/1989 | Alspector | 307/201 |
| 4,875,183 | 10/1989 | Graf et al. | 364/807 |
| 4,881,239 | 11/1989 | Stenzel et al. | 373/70 |
| 4,896,053 | 1/1990 | Kesselring | 307/201 |
| 4,903,226 | 2/1990 | Tsividis | 364/807 |
| 4,904,881 | 2/1990 | Castro | 307/201 |
| 4,906,865 | 3/1990 | Holler | 307/353 |
| 4,912,647 | 3/1990 | Wood | 364/513 |
| 4,912,649 | 3/1990 | Wood | 364/513 |
| 4,912,651 | 3/1990 | Wood | 364/513 |
| 4,912,652 | 3/1990 | Wood | 364/513 |
| 4,912,653 | 3/1990 | Wood | 364/513 |
| 4,912,654 | 3/1990 | Wood | 364/513 |
| 4,912,655 | 3/1990 | Wood | 364/513 |
| 4,914,603 | 4/1990 | Wood | 364/513 |
| 4,918,618 | 4/1990 | Tomlinson, Jr. | 364/513 |
| 4,926,064 | 5/1990 | Tapang | 307/201 |
| 4,947,482 | 8/1990 | Brown | 364/807 |
| 4,950,917 | 8/1990 | Holler et al. | 307/201 |
| 4,951,239 | 8/1990 | Andes et al. | 364/807 |
| 4,956,564 | 9/1990 | Holler et al. | 307/201 |
| 4,961,005 | 10/1990 | Salam | 307/201 |
| 4,962,342 | 10/1990 | Mead et al. | 307/201 |
| 4,972,363 | 11/1990 | Nguyen et al. | 364/807 |
| 4,994,982 | 2/1991 | Duranton et al. | 364/513 |
| 4,996,648 | 2/1991 | Jourjine | 364/513 |
| 5,004,932 | 4/1991 | Nejime | 307/201 |

FOREIGN PATENT DOCUMENTS

| | | | |
|---|---|---|---|
| 3810292 | 10/1989 | Fed. Rep. of Germany | 373/106 |
| 1522433 | 11/1989 | U.S.S.R. | 373/104 |

OTHER PUBLICATIONS

Persson, "Analyzing the electrical characteristics of arc furnace" 47th Electric Furnace Conference (1989).

(List continued on next page.)

Primary Examiner—Bruce A. Reynolds
Assistant Examiner—Tu Hoang
Attorney, Agent, or Firm—Laff, Whitesel, Conte & Saret

[57] ABSTRACT

An improved arc furnace regulator employs neural circuits connected in a multi-layer network configuration with various weighted relationships between the successive layers which are automatically changed over time as a function of an error signal by means of the back-propagation method so that the regulator gradually improves its control algorithm as a result of accumulated experience. The network is implemented in software which can be developed and run on a PC with extra co-computing capability for greater execution speed. A second trainable neural network which emulates the arc furnace is used to develop the error signal, and is trained in mutually exclusive time periods with the training of the regular network.

30 Claims, 20 Drawing Sheets

OTHER PUBLICATIONS

Bliss & Harper, "Optimization of Electric Arc Furnace Electrode Control Through Closed Loop Control", AISE Iron and Steel Exposition (1989.

Lapedes & Farber, "How Neural Nets Work", Neural Information Processing Systems pp. 442-456 (1988).

Widrow & Hoff, "Adaptive Switching Circuits", 1960 IRE Wescon Convention Record, part 4, pp. 96-104 (1960).

Rumelhart, Hinton & Williams, "Learning Internal Representations by Error Propagation", vol. 1, MIT Press (1986).

Rumelhart, Hinton & Williams, "Learning Representatives by back-Propagating Errors", Nature 323: 533-536 (1986).

Minai & Williams, "Back-propagation Heyristics: A study of the Extended Delta-Bar-Delta Algorithm", IJCNN, vol. 1, pp. 595-600 (1990).

| |
|---|
| SECONDARY VOLTAGE--PHASE A TO HEARTH ~810 |
| SECONDARY VOLTAGE--PHASE B TO HEARTH ~812 |
| SECONDARY VOLTAGE--PHASE C TO HEARTH ~814 |
| SECONDARY CURRENT--PHASE A ~816 |
| SECONDARY CURRENT--PHASE B ~818 |
| SECONDARY CURRENT--PHASE C ~820 |
| PRIMARY POWER FACTOR(W/VA)--PHASE A ~822 |
| PRIMARY POWER FACTOR(W/VA)--PHASE B ~824 |
| PRIMARY POWER FACTOR(W/VA)--PHASE C ~826 |
| PERSSON ARC STABILITY FACTOR--PHASE A ~828 |
| PERSSON ARC STABILITY FACTOR--PHASE B ~830 |
| PERSSON ARC STABILITY FACTOR--PHASE C ~832 |
| SECONDARY "KW RATIO" FACTOR--PHASE A ~834 |
| SECONDARY "KW RATIO" FACTOR--PHASE B ~836 |
| SECONDARY "KW RATIO" FACTOR--PHASE C ~838 |
| TIME FROM BEGINNING OF HEAT ~840 |

~800

FURNACE STATE VECTORS "S"

FIG. 7

| |
|---|
| ELECTRODE A UP/DOWN ~882 |
| ELECTRODE B UP/DOWN ~884 |
| ELECTRODE C UP/DOWN ~886 |

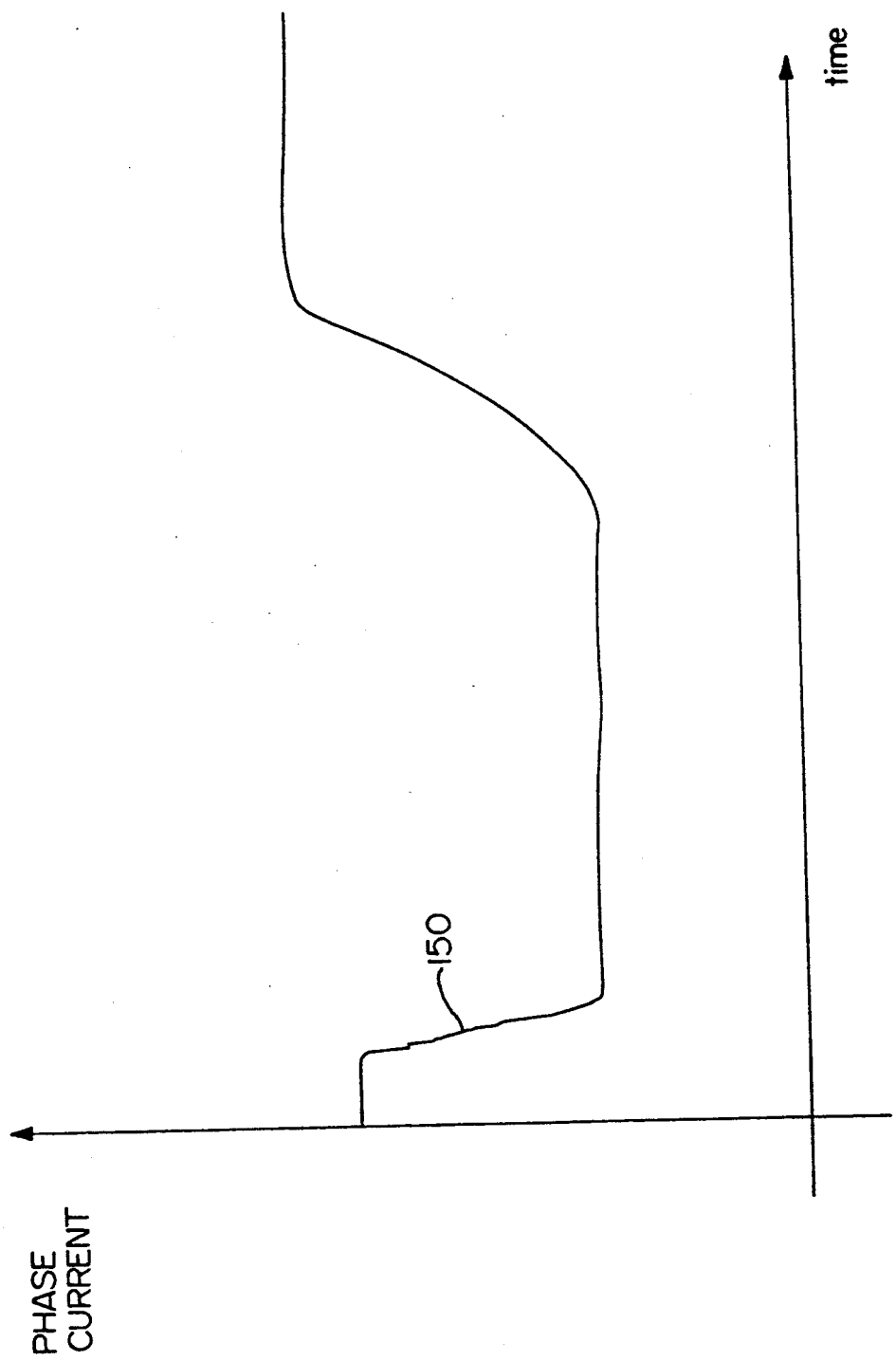

CONTROL SYSTEM FOR ELECTRIC ARC FURNACE

FIELD OF THE INVENTION

This invention relates to the control of chaotic processes such as arc furnaces, and in particular to a control system which employs trainable elements such as neural networks to achieve a control algorithm which automatically improves with experience.

BACKGROUND OF THE INVENTION

The art of controlling chaotic processes is in a rudimentary state of development. A chaotic process is defined as one which is deterministic in nature, but nevertheless difficult or impossible to predict because its behavior over time is described by an a periodic function. An example of such a process which is regularly encountered in actual industrial practice is the manufacture of steel from scrap metal by means of an arc furnace. Such furnaces employ very large electrical currents, delivered by heavy graphite electrodes, to melt a violent cauldron of material under controlled temperature conditions over an extended process cycle. Despite the violent conditions inherent in such a process, precise control over the electrical parameters thereof is essential, not only to improve the quality of the steel end product, but also to keep the large process costs in check. And, because of these violent conditions, precise control is an essential safety requirement.

The amount of electrical power typically employed in a large steel-making arc furnace is so great that it is comparable to the usage of an entire city. The currents involved are comparable to a lightning stroke, and far greater in duration. Nevertheless, the temperature and current profiles of each "heat" of steel must be fairly controlled over the duration of the melt in order to determine the nature of the steel produced. In addition, the current drawn by each of the electrodes must be limited for reasons of economy, because the electric "bill" attendant upon such processes is a major cost for the steel producer. The accepted method for controlling the electrode current in large arc furnaces is by dynamically adjusting the arc length through the continuous raising and lowering of the graphite electrodes, of which there are typically three for each furnace.

The penalties for failure to control the positions of the electrodes with sufficient accuracy are severe. If the electrode is not lowered enough, and the arc length consequently is allowed to become too great, the arc may sputter and even be extinguished, thus seriously interfering with the processing of the "heat." If the electrode is lowered too much, so that the arc length becomes too short, not only is excessive current consumed, which is expensive, but the graphite material of the electrode is consumed too rapidly, which also unnecessarily adds to the cost of steel production. Power consumption can be as high as 550 KWH per ton of steel produced, and the cost of electrode consumption is typically of the order of 6 cents per pound of steel produced. Excessive arc currents are also associated with greater rates of electrical component failure. In the extreme case the arc length may be reduced to zero, causing the electrode to become short-circuited to the contents of the furnace, and interrupting the processing thereof. If the arc flashes over to the refractory walls of the furnace, moreover, the latter may be consumed too rapidly or even damaged, resulting in additional repair costs and down time.

Through experience, the art has developed a set of rules of thumb which tell us when to raise and lower the electrodes in order to avoid these catastrophes. These rules are dependent upon the measurement of certain electrical parameters of the arc power supply which have been found empirically to have predictive value, for reasons which are imperfectly understood. See, for example, Persson U.S. Pat. No. 4,620,308; Persson, "Analyzing the Electrical Characteristics of Arc Furnaces," 47th Electric Furnace Conference (1989); Bliss & Harper, "Optimization of Electric Arc Furnace electrode Control Through Closed Loop Control," AISE Iron and Steel Exposition (1989).

These rules of thumb are stored in a conventional rule-based "expert systems" device which keeps track of the time profile of the heat and also monitors running measurements of the predictive electrical parameters, and based on that information outputs a set of desired set-points for those parameters. A device of this type is presently available on the market from the Milltech-HOH Company of Davenport, Iowa under the trademark CONTROLTECH II. This device consists of, among other things, a microcomputer and its associated I/O devices, a power transducer subsystem capable of acquiring all necessary volt, ampere, watt, watt-hour, and power factor signals from an operating arc furnace, and an output subsystem which is capable of continuously adjusting the furnace regulator set-points for each phase of the electrode power supply.

The set-point output of the CONTROLTECH II device is directed to a furnace regulator device, which responds to this information by developing drive output signals which cause the furnace electrode control mechanisms to raise and/or lower each of the furnace electrodes according to a selected control algorithm which is designed to maintain the parameters as close as possible to the set-points presently directed by the rule-based device. A prior-art furnace controller of this type which is in common use at the present time is available from the Robicon Corporation of Pittsburgh, Pa. See U.S. Pat. No. 4,029,888.

Such prior-art furnace regulators do not have the ability to "learn" or otherwise improve their performance over time as a result of operating experience. They are forever limited to the inherent capabilities of a fixed control algorithm which is built in to the regulator circuitry, and thus never changes, short of a redesign and replacement of the regulator circuit hardware. If such a furnace regulator were realized in software, it would of course have a greater measure of flexibility, in that an improvement in the control algorithm could be implemented without a change in hardware, but rewriting and debugging of the source code, recompilation to generate new object code, and reinstallation and retesting of the new algorithm would still be necessary.

An "artificial intelligence" technology is available, however, which has the ability to "learn" from experience or "train" itself to improve its own performance automatically, i.e. without any kind of operator intervention or modification either of a hardware or a software nature. Often referred to as "artificial neural network" technology, this approach can be implemented either in hard-wired circuitry or simulated in software on conventional general-purpose programmable binary digital computers, including even the personal computers which are in common use today, such as Apple Macintosh or IBM-PC computers and compatibles (although in such cases greater than normal amounts of memory or co-processing speed and capacity may be necessary or advisable).

This neural network technology involves the use of multi-valued logic circuits, each of which simulates a biological neuron in the sense that it is activated in response to multi-valued or weighted inputs. Thus, neural circuits are not limited to the two discrete input values characteristic of the binary logic circuitry found in the vast majority of conventional digital computers which are in common use today. A plurality of these logic circuits are typically connected to each other to form a layer, and a number of such layers are normally connected together to form a network including an input (or bottom) layer, an output (or top) layer, and at least one hidden layer interposed between the input and output layers. Lapedes & Farber, "How Neural Nets Work," Neural Information Processing Systems pp. 442-456 (1988). The internal algorithm of the network can be changed by altering the weights assigned to various connections between the outputs of a lower layer and the inputs of a layer above it.

This type of circuitry is especially powerful when the alteration of the weights is done automatically as a function of a control error measurement, because then the control algorithm of the network converges over time to a form that not even the programmer of the original network configuration could have predicted in advance. See Widrow & Hoff, "Adaptive Switching circuits," 1960 IRE Wescon Convention Record, part 4, pp. 96-104 (1960). Among the weight-modification algorithms which have been recognized in the literature are the gradient descent search technique known as the back-propagation method. See Rumelhart, Hinton & Williams, "Learning Internal Representations by Error Propagation," in Rumelhart & McClelland, "Parallel Distributive Processing: Explorations in the Microstructure of Cognition," vol. 1, MIT Press (1986); Rumelhart, Hinton & Williams, "Learning Representations by Back-Propagating Errors," Nature 323:533-536 (1986). A particular variant of that algorithm has been described in Minai & Williams, "Back-Propagation Heuristics: A Study of the Extended Delta-Bar-Delta Algorithm," IJCNN, vol 1, pp. 595-600 (1990).

It is understood in the art that neural networks and the back-propagation method of "on-the-job training" can be implemented in software on conventional programmable digital computers. In addition, there is at least one commercially available development program which runs under the popular MS-DOS operating system on ordinary IBM-compatible personal computers, and is designed for the development of neural network simulations which employ the back-propagation method and the Delta-Bar-Delta algorithm for self-modification of the network's internal control function.

BRIEF SUMMARY OF THE INVENTION

The present invention takes advantage of the capabilities of neural networks and back-propagation or similar self-training techniques to provide a new type of regulator which is suitable for controlling arc furnaces and other chaotic processes in a more effective and sophisticated manner than has heretofore been possible. When connected in a appropriate control configuration, these inventive regulators not only take over the control function at the highest level of effectiveness which current control algorithms are capable of, but they go well beyond that, in that over time they learn from any mistakes which result from inadequacies of the initial control algorithm, and automatically improve the control algorithm without operator intervention of any kind by repeatedly reevaluating and reprogramming the decision weights within the neural network.

In a preferred embodiment of the invention, a fully connected network containing over 200 neurons is simulated in software which was developed by means of a commercially available network development program. Both the development program and the resulting network emulation are capable of running on an IBM PC-compatible digital personal computer, and the network employs the Extended Delta-Bar-Delta adaptation algorithm in its training mode.

BRIEF DESCRIPTION OF THE DRAWINGS

These and other features of this invention will be best understood by reference to the following detailed description of a preferred embodiment of the invention, taken in conjunction with the accompanying drawings, in which:

FIG. 7 is a diagram depicting the organization of a furnace state vector used in implementing the regulator of FIGS. 4-5;

FIG. 8 is a diagram depicting the organization of a regulator state vector used in implementing the regulator of FIGS. 4-5;

FIG. 10 is a graph showing desired values of phase current over time during the melting of a batch of scrap steel in a typical electric arc furnace;

DETAILED DESCRIPTION OF THE PREFERRED EMBODIMENT

Figure 1:
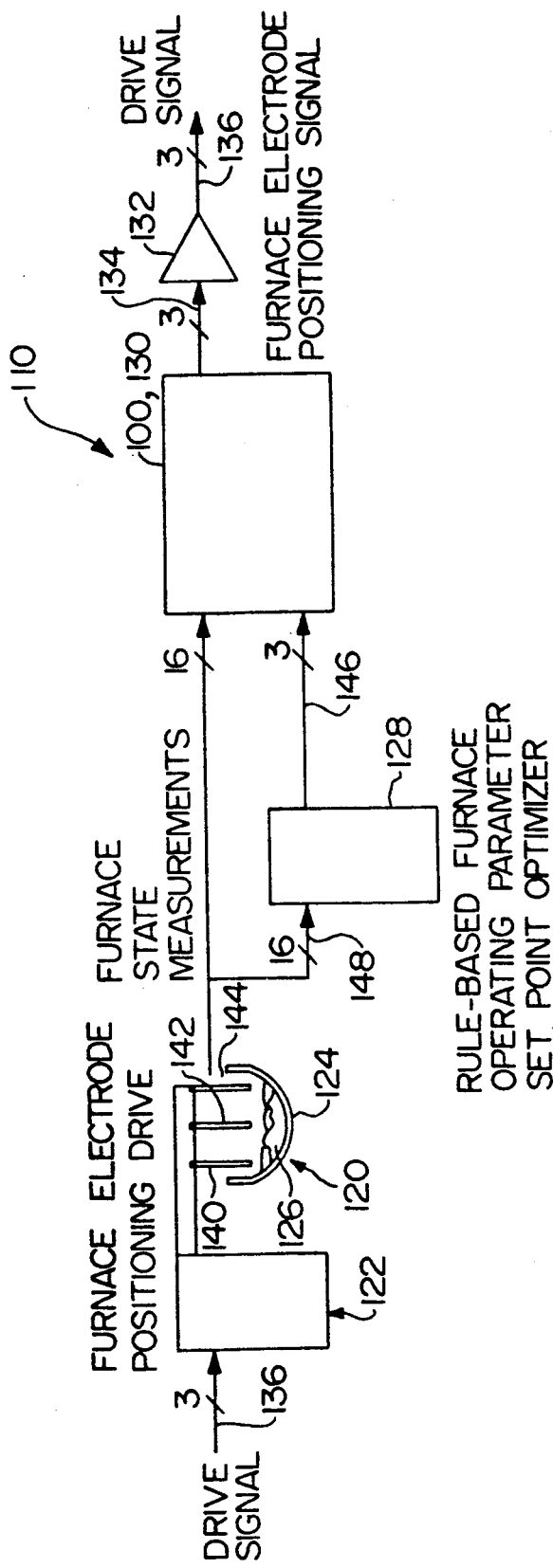
FIG. 1 is a simplified block diagram of a system for controlling an electric arc furnace using either a prior art regulator or an adaptive regulator constructed according to the present invention.

In order to present an overview of the environment in which the present invention may be used, FIG. 1 depicts a simplified block diagram of an appropriate control system 110 for a typical electric arc furnace 120 used in the production of steel from scrap and raw materials. The furnace 120, which is shown schematically, has a large vessel 124 for holding a burden of material 126 to be melted. The furnace 120 has a number of large movable electrodes 140, 142, 144, which are suspended above the burden. In operation, a supply of three-phase electrical power (FIG. 2) is connected to the electrodes 140, and an arc is struck between each of the electrodes and the burden. The arcs produce large amounts of heat which melts the burden. Although the present invention is described in terms of this environment, it could also be applied to solve many other problems involving the regulation of chaotic (i.e. deterministic but aperiodic) processes.

The operation of the furnace 120—that is, the amount of power supplied to the furnace and certain other electrical characteristics such as power factor and arc duty cycle—is controlled primarily by adjusting the lengths of each arc. The arc lengths are adjusted by raising or lowering the electrodes 140, 142, 144 to vary the distance between the tip of each electrode and the burden below. Since the burden may consist of scrap metal, raw materials, and other constituents, the topography presented by the burden is non-uniform and shifts substantially as portions melt or fall.

Accordingly, a suitable regulator device, either a prior art regulator 130 or an adaptive regulator 100 according to the present invention, monitors the state of the furnace 120 and produces signals 134 indicating whether the position of each electrode should be raised or lowered. For example, signals 134 produced by the regulator 100 may be low-power analog signals having a maximum voltage swing between +15 and −15 V. The diagram of FIG. 1 indicates system operation with either the prior-art regulator 130 or the inventive regulator 100; according to the invention, the adaptive regulator 100 is simply substituted for the prior-art regulator 130 in an otherwise identical system.

A furnace electrode positioning drive mechanism 122 responds to the signals 136 to suitably position the electrodes as instructed by regulator 130 or 100. The electrodes 140, 142, 144 in a typical furnace are large and the positioning mechanism must therefore be relatively powerful. Appropriate electric motors or hydraulic cylinders are typically used to operate the positioning mechanism in the positioning system 122. An amplifier 132 preferably converts the regulator output signal 136 to high-voltage, high-current drive signals 136 suitable for driving these motors. An amplifier capable of providing +/−250 V at 10 A is appropriate for driving the positioning motors, which are typically 6 HP DC motors. However, other positioning mechanisms could also be used if amplifier 132 is modified to produce an output signal 136 suitable for that mechanism. The electrode positioning mechanisms now in common use on electric arc furnaces are capable of moving each of the massive electrodes at a rate of about 1.25 to 1.5 inches per second.

The function of regulator 100 or 130 is to control the arc length so as to keep the actual operating parameters of furnace 120 as close as possible to a set of desired furnace operating parameters or set-points. The set-points which are typically provided to the regulator 100 or 130 are the desired arc currents for each electrode or power supply "phase". In the past, these set-points were selected by a human operator and communicated to the regulator 130 by adjusting one or more rheostats calibrated in per cent of maximum Amperes. During the course of production of a batch (or "heat") of steel in the furnace, it is desireable to vary the rate of heating provided by the arcs. Accordingly, the operator, using his knowledge of the heating requirements of the particular steel to be produced, and of the characteristics of the particular scrap and other constituent materials which are being melted, used to vary the set-points as needed. The regulator would then adjust the electrode height (and therefore the arc length) in order to achieve the current set-point selected by the operator.

Figure 3:
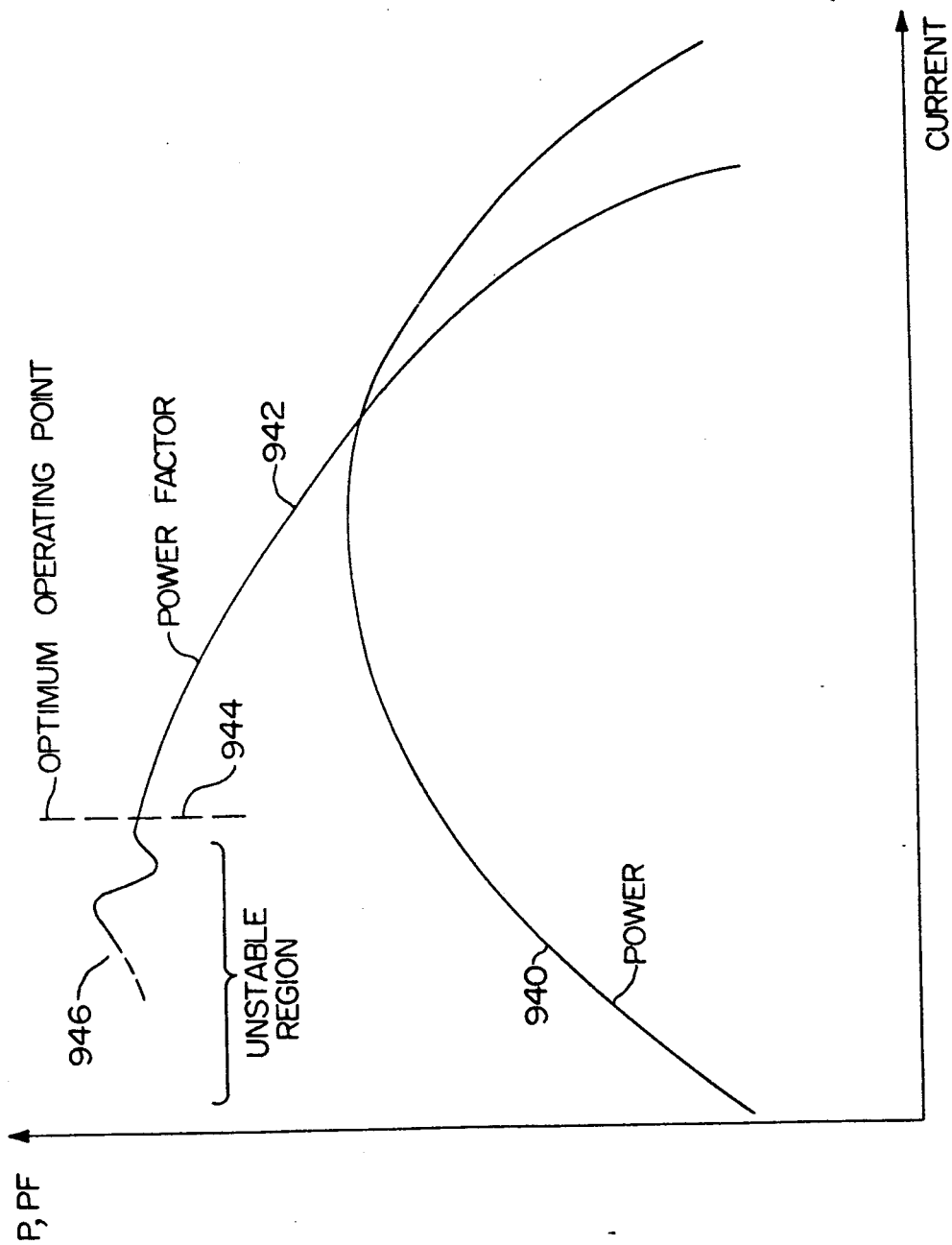
FIG. 3 is a graphical representation of the interaction between phase current, power, and power factor in a typical electric arc furnace, and indicates an optimum operating point for the furnace.

FIG. 3 contains a graph showing the relationship between current, power, and power factor in a typical electric arc furnace power supply circuit. Curve 940 represents power. Curve 942 represents power factor. As current is reduced, power factor increases. Because furnace operation is more energy-efficient at higher power factors, it is generally desireable to run the furnace at the highest possible power factor. In order to achieve a higher power factor, it is necessary to lower the phase current. In order to lower the phase current, however, it is necessary to make the arc length greater, by raising the electrode. Arc lengths beyond an empirically determined threshold cause the arc to become unstable, however, resulting in the unstable region 946 shown on the graph. Thus, an optimal furnace operating current is one which maximizes power factor while remaining in the stable arc region, as shown by dotted line 944. Accordingly, one goal of arc furnace current regulation is to maintain furnace operating current near but not beyond the optimal operating point 944.

More recently, devices have been produced for automatically establishing and varying optimal set-points according to operator-supplied information concerning the materials to be melted, and predefined rules incorporating an operator's knowledge of the melting process. A rule-based set-point optimizer 128 of this type is shown in FIG. 1. The optimizer 128 receives a set of signals 148 representing the present operating state of the furnace. The output of the optimizer 128 is a set of signals 146 representing the desired set-points. The regulator 130 or 100 is adapted to receive and respond to set-point signals 148 instead of, or in addition to, the aforementioned rheostats. FIG. 10 is a graph of the desired input current in a typical furnace over the course of a single melt. Because the set-point signal may be merely a scaled function of the desired input current, line 150 represents both the desired input current and the set-point supplied by optimizer 118. Whether used with a prior-art regulator 130 or the inventive regulator 100, the set-point optimizer 118 reduces costs by improving furnace energy efficiency and reducing the consumption of electrode material. Each of these is a major factor in the operational cost of the furnace. Although it is not essential to use the set-point optimizer 128 in order to achieve the benefits of the inventive regulator 100, the optimizer maximizes those benefits by presenting at any given time the most appropriate set-points for the regulator 100 to respond to.

Figure 2:
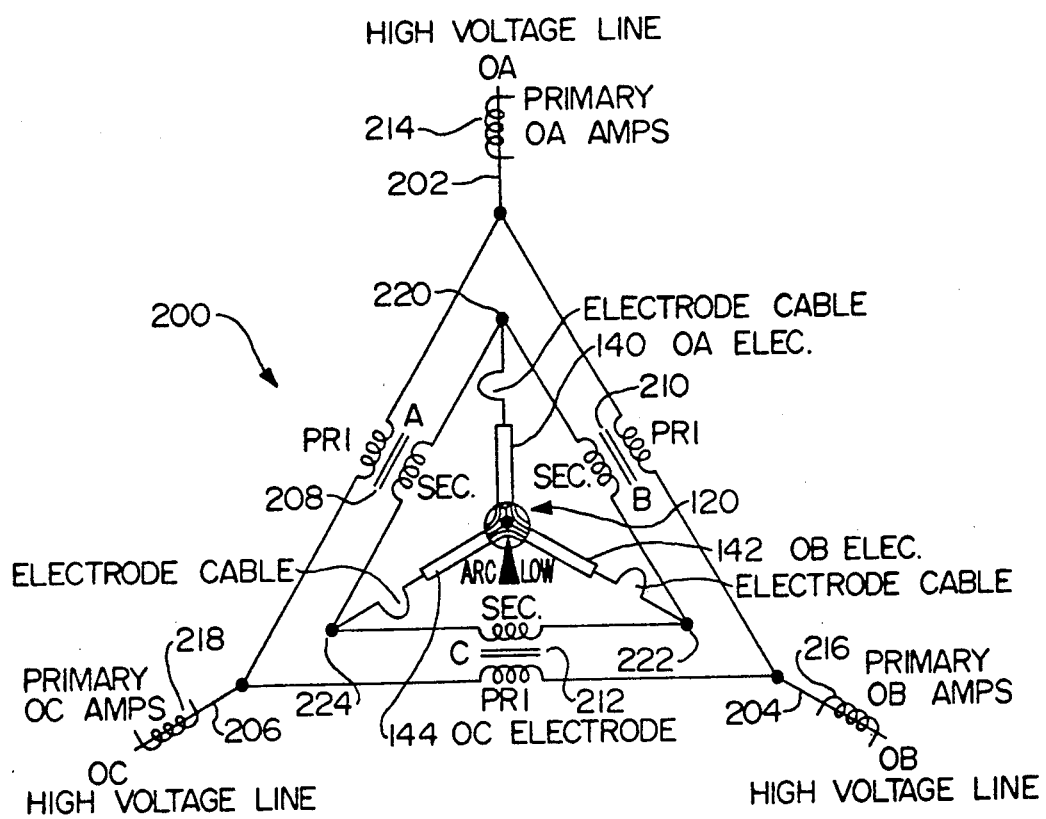
FIG. 2 is a simplified electrical schematic diagram showing an electrical power supply and monitoring connections for a typical electric arc furnace.

FIG. 2 is an electrical schematic diagram of the arc furnace 120 of FIG. 1 and an appropriate power supply circuit 200 therefor. Electrical power is distributed to the furnace through a conventional three-phase alternating current power distribution circuit over high-voltage lines 202, 204, and 206. Transformers 208, 210, and 214 are provided to reduce the high voltage provided on the distribution circuit to relatively low voltages (e.g. 600 V) suitable for arc furnace operation. The primaries of transformers 208, 210, and 214 are connected in a "delta" configuration to the high-voltage lines 202, 204, and 206. The secondaries are similarly connected in a "delta" configuration. Nodes 220, 222, and 224 denote transformer output conductors for phases A, B, and C, respectively. Electrodes 140, 142, and 144 are connected to these conductors via suitable electrode cables. During furnace operation, a continuous current of the order of 20,000 to 100,000 A through each electrode is typical.

A typical furnace 120 used in the United States (and several other industrialized countries) has three electrodes, because most electricity in these countries is generated by and distributed along so-called "three-phase" alternating-current circuits. Conventionally, each of the furnace electrodes 126 is connected to a respective one of the three "phases" or conductors of such a power supply circuit. However, other power supplies, such as two- or four-phase alternating current, and even direct current power supplies are known and are also suitable for use in arc furnace applications. Accordingly, although the remainder of this application will refer to three electrode systems and three-phase power supplies, the inventors contemplate use of the invention with any suitable power supply for an electric arc furnace.

In order to provide information as to the present operating state of the furnace 120 to the regulator 130 or 100 and to the set-point optimizer 118, suitable monitoring devices may be provided to measure current, voltage, and power factor in the primary and secondary power supply circuits. For example, as shown in FIG. 2, current transformers 214, 216, and 218 are provided to sample the current flowing in each of the primary power supply conductors 202, 204, and 206. Similar current transformers (FIG. 6) could be provided in the secondary conductors. Potential transformers (FIG. 6) could also be provided to measure the voltages present on the primary and secondary conductors.

Figure 4:
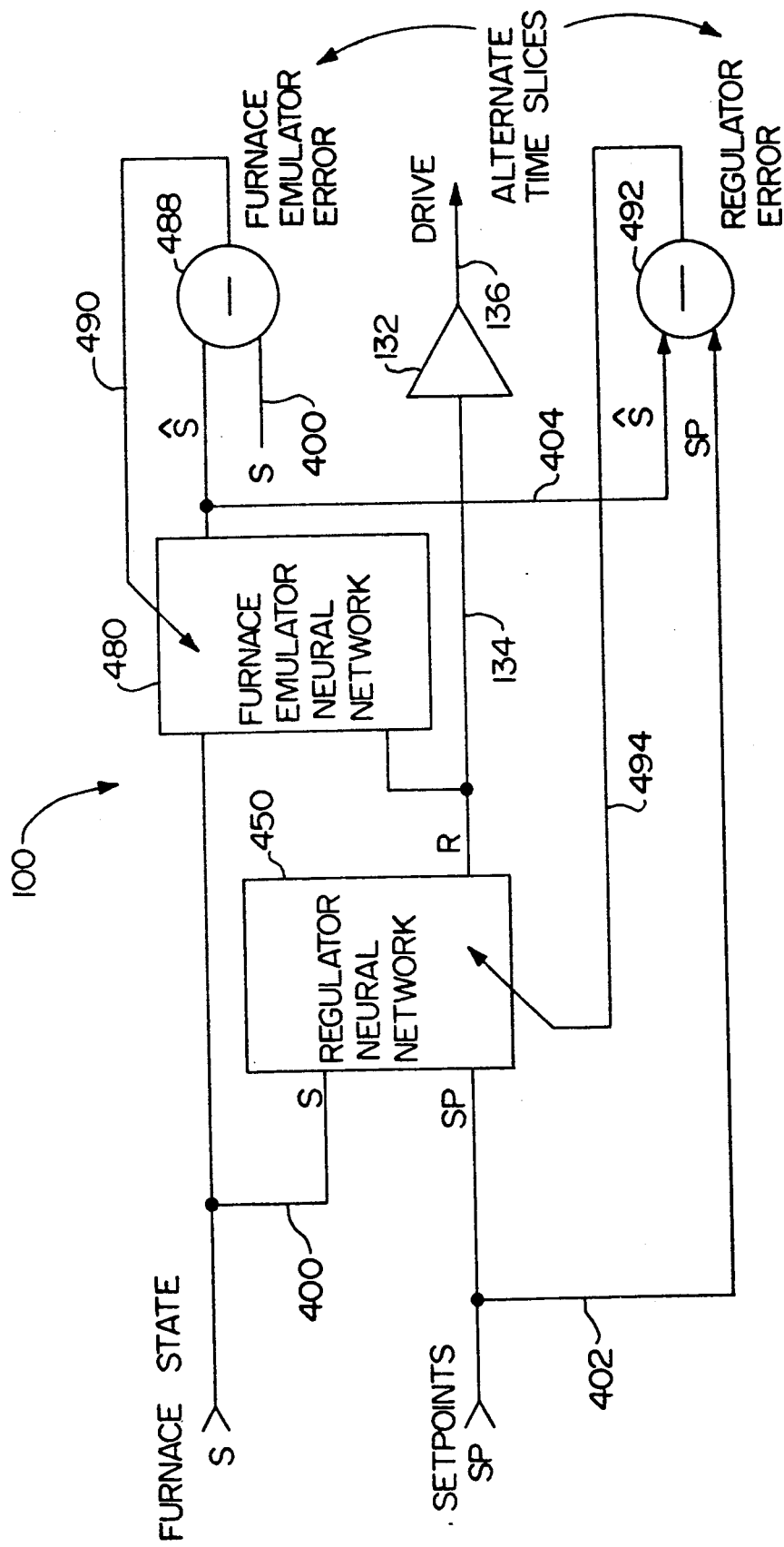
FIG. 4 is a simplified block diagram of an adaptive, neural-network-based regulator constructed according to the present invention, shown in an operational configuration.

An adaptive neural-network-based regulator 100 constructed according to the present invention will be first described in overview form with reference to FIG. 4. The inventive regulator 100 will then be described in greater detail with reference to FIGS. 5-14.

FIG. 4 is a simplified block diagram of an adaptive, neural-network based regulator 100 constructed according to the present invention. The inventive regulator 100 replaces the prior art regulator 130 in the block diagram of FIG. 1. The regulator 100 receives information as to the present state of the furnace 120 (FIG. 1) along lead 400, and receives the present desired furnace operating set-points along lead 402. The regulator 100 produces appropriate signals 134 for controlling the furnace electrode positioning mechanism 122 (FIG. 1). These signals 134 are converted by amplifier 132 to a sufficient amplitude to drive motors or other transducers (not shown) in the positioning mechanism 122 (FIG. 1) in order to adjust the vertical position of the furnace electrodes 140, 142, 144 (FIG. 1), thereby controlling the length of the arc and consequently, the power factor and amount of current flowing in each arc circuit.

The regulator 100 comprises two major components: a Regulator Neural Network 450 (RNN) and a Furnace Emulator Neural Network 480 (FENN). The RNN 450 is designed to provide signals to adjust the vertical position of the furnace electrodes so that furnace operation conforms as closely as possible to set-points provided by a human operator or a set-point optimizer 118 (FIG. 1). The RNN 450 receives information on the present operating state of the furnace 120 and the desired furnace operating state (i.e. set-points). The RNN 450 uses this information, together with stored records of immediately previous furnace states and regulator outputs, to produce an appropriate regulator output signal 134 for controlling the position of the furnace electrodes in a manner that, as closely as possible, matches the provided set-points. The FENN 480 is designed to emulate the operation of the furnace. The FENN 480 receives information on the present state of the furnace 120 and the output of RNN 450, and uses it, together with stored records of previous values, to predict what the furnace operating state will be a short time interval into the future.

The characteristics of the neural networks 450, 480 used to implement the inventive regulator 100 will be described later in greater detail. At this point, it is sufficient to describe networks 450, 480 as control systems having the ability to automatically adapt certain internal parameters so as to minimize the error between their actual outputs and a set of desired or reference values. Accordingly, for each of the networks 450, 480, a comparison is performed to measure the discrepancy between the actual output of the network and its ideal output, and the results of that comparison are used by the network to adjust the necessary internal parameters to minimize this error.

During operation of the inventive regulator 100, this comparison and adjustment occurs repeatedly so that the performance of each of the networks 450, 480 is constantly improved. Thus, the FENN 480 "learns" over time how to better and better emulate the actual performance of the furnace 120, and the RNN 450 "learns" over time how to better and better regulate the furnace to match the set-points.

Since the function of the FENN 480 is to identically emulate or predict the operating state of the furnace 120, its performance may be measured simply by comparing its predicted furnace state output (lead 404) to the actual state of the furnace 120 (lead 400). Accordingly, comparator 488 performs this comparison and produces a furnace emulator error result 490 which may be used by the FENN 480 to adjust its internal operating parameters.

As previously described, the RNN 480 is intended to produce signals for regulating the operation of the furnace 120 so that it conforms to a set of desired furnace operating parameters or set-points provided on lead 402. Measuring the performance of the RNN 450 is more difficult than measuring FENN performance, because during operation of the inventive regulator 100, there exists no reference signal to which the output 134 of the RNN may be directly compared. For example, if a prior-art regulator 130 were installed to provide the reference signal, then RNN 450 would adjust its internal parameters to identically mimic the operation of the prior-art regulator, which would result in regulation no better than that provided by the prior art. On the contrary, it is desired that RNN 450 adjust its internal parameters to provide a substantial improvement over the regulation of prior art devices.

If the RNN 450 is providing imperfect regulation, the current state of the furnace 120 will deviate from the set-points. If the FENN 480 is operating properly, its output 404 will more closely approximate the actual operating state of furnace 122. Therefore, the quality of regulation provided by the RNN 450 may be measured by comparing the output 404 of FENN 480 to the set-points provided on lead 402. This comparison is performed by comparator 492 to produce a regulator error result 494 which may be used by the RNN 450 to adjust its internal operating parameters.

Although the error result outputs 490, 494 of comparators 488, 492 appear in FIG. 4 as signals which are fed back to inputs of the FENN 480 and RNN 450 respectively, this is not intended to represent a conventional feedback path. It is a characteristic of the type of neural networks preferably used to implement the FENN 480 and RNN 450 that the comparison between the output signal and the reference signal occurs automatically, and that the error result from that comparison is used automatically to adjust the network's internal parameters without explicit introduction of the error result as an input to the network. This function is referred to as "back-propagation." Thus, the leads associated with error results 490, 494 actually represent the implicit propagation of error information backward through the networks to adjust the internal parameters. The comparator and output signals are shown explicitly in the drawings, however, so that the reader may understand the sources of the information by which the performance of the networks is measured and adjusted.

Now that the back-propagation mechanism of the neural networks 450, 480 has been introduced, the need for the FENN 480 can be justified. As previously discussed, during operation of the inventive regulator 100, there exists no reference signal to which the output 134 of the RNN 450 may be directly compared. Accordingly, it is necessary to measure the performance of the RNN 450 by comparing the behavior of the furnace 120, as regulated by the RNN 450, to the set-points which describe the desired furnace behavior. However, as previously explained, the comparison of the neural network output with a reference signal to produce an error result, and the back-propagation of that error result to adjust the network's internal parameters, are functions automatically performed by the network itself.

Thus, if the actual furnace operating state were directly compared to the furnace operating set-points, there would be no mechanism by which the error information could be introduced to the RNN 450 so that its internal parameters could be adjusted. Instead, the behavior of the furnace 120 is accurately modeled by FENN 480, and the FENN output 486 representing that behavior is compared to the furnace operating set-points. As a result, this evaluation of RNN 450 performance is available to the FENN 480. Through back-propagation, the error information from this comparison is automatically transferred through the FENN 480 into the RNN 450, where it is used to automatically adjust the operating parameters of that network.

Figure 18A:
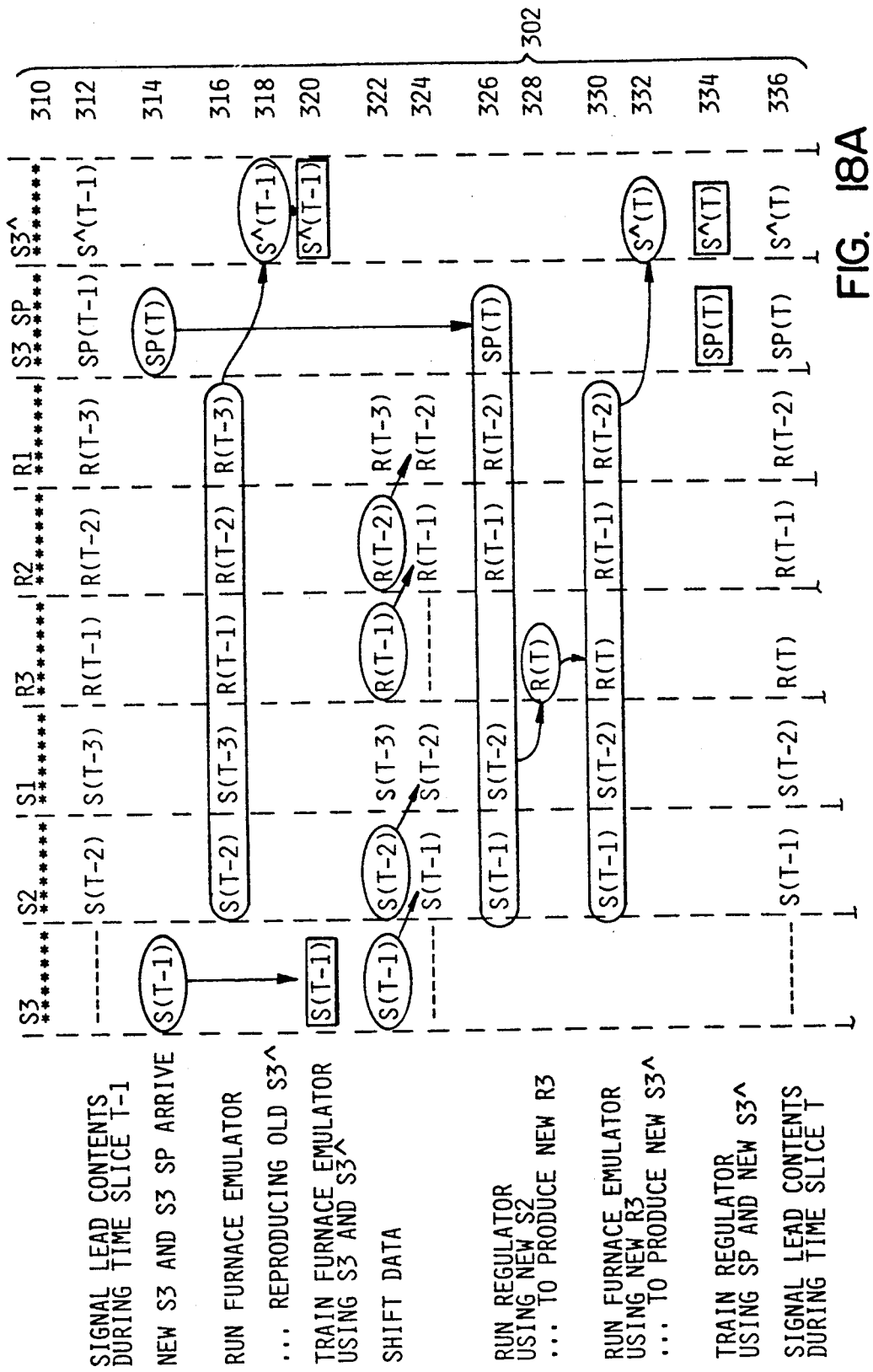
FIG. 18 is a diagram showing the sequence of operations and the movement of data within the inventive regulator of FIGS. 4-5 during brief "adjustment intervals" which are included in the operational time slices of the regulator.
Figure 18B:
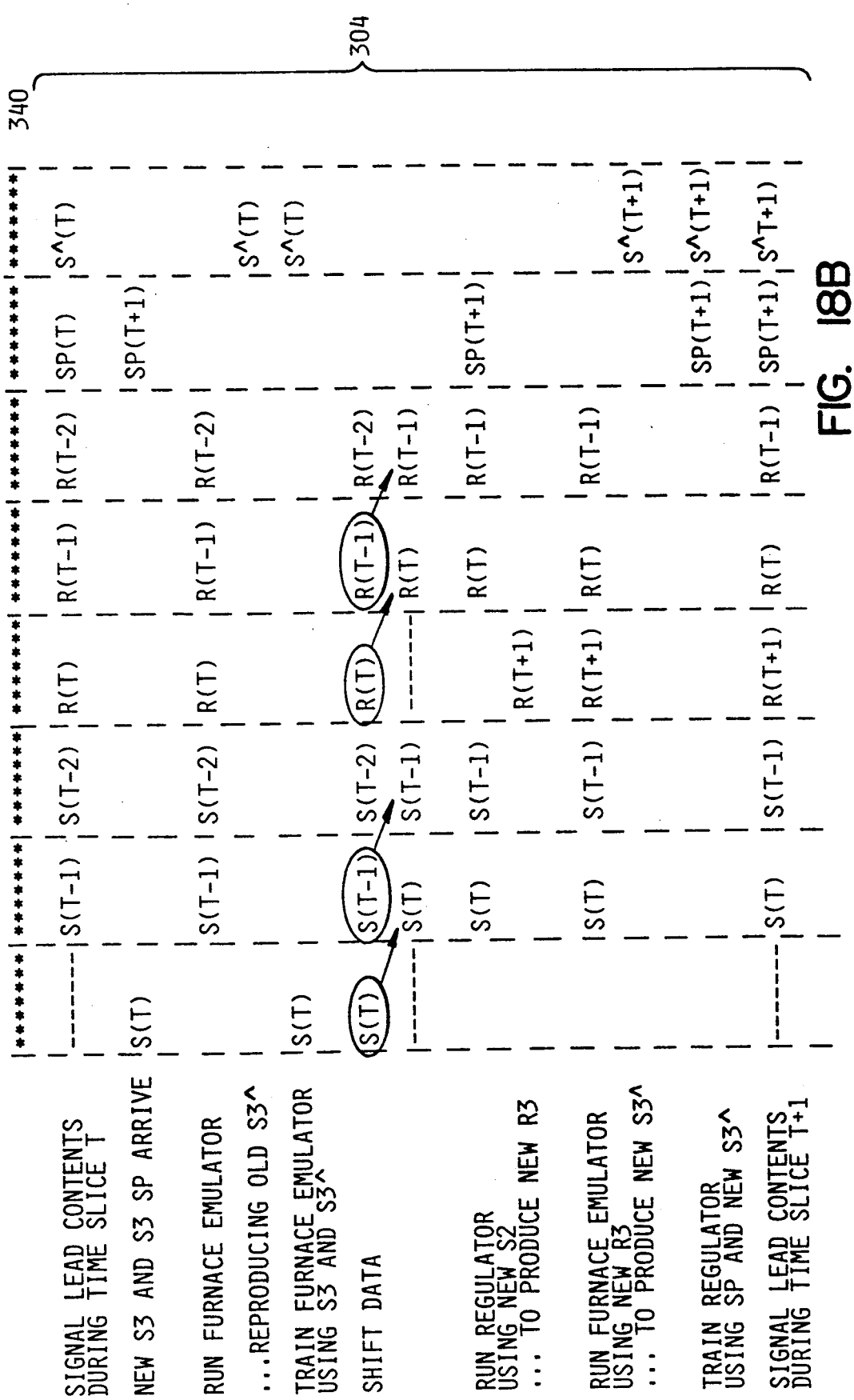

The regulator 100 does practically continuously vary its outputs. Instead, it operates on a cyclical basis, presenting new output values each time a predetermined interval elapses. This predetermined interval is referred to herein as a time slice, and is preferably in the range of 100 to 250 mS. During a brief "adjustment interval," which occurs once for every time slice, furnace state information and other real-world input data collected during the previous time slice are presented to the neural networks 450, 480, and the networks produce a revised set of output values, including the regulator output signal 134 used to control the position of the furnace electrodes. In addition, the internal parameters of the RNN 450 and the FENN 480 are revised during the adjustment interval. Details of the activities conducted during these intervals, including training of the networks 450, 480, are shown in FIG. 18 which is discussed later in greater detail.

As noted in FIG. 4, the adjustment of the internal parameters of the RNN 450 and FENN 480 are performed in separate steps and at mutually exclusive times during each adjustment interval. In a first training step during the adjustment interval, the furnace emulator error is measured and the FENN 480 is adjusted, while the internal parameters of the RNN 450 are held fixed. In a second training step during the adjustment interval, the regulator error is measured and the RNN 450 is adjusted, while the internal parameters of the FENN 480 are held fixed. The two networks are thus isolated from each other in this way during adjustment to prevent erroneous operation of one network from producing an incorrect adaptation or adjustment in the other network.

Because the cyclical adjustment of the internal parameters of the RNN 450 and FENN 480 occurs repeatedly whenever the inventive regulator 100 is operating, and because the interval between such adjustments is short in relation to human-perceptible time scales, we refer herein to this adjustment process as operating "practically continuously", even though the adjustments actually occur in discrete process steps. We note, however, that the discrete nature of these adjustments is merely an artifact of the use of a digital computer to simulate neural networks, and that if suitable hardware-implemented neural networks were used, the adjustments would occur "continuously" in a strict sense.

For example, suppose that at a given time, RNN 450 were performing poorly (i.e. erroneously), while FENN 480 were performing perfectly. If the FENN 480 were permitted to adapt based on error information produced by the erroneous regulation by the RNN 450, the adjustment so produced would be one which tends to minimize RNN error, rather than to minimize FENN error. Such an adjustment would produce an undesired deviation in the performance of the FENN in the direction away from perfect emulation. Effectively, the FENN 480 would "learn" or adapt to emulate a different furnace—a fictitious furnace for which the improperly operating RNN 450 would provide correct regulation. Thus, by fixing the internal parameters of each neural network while the other is adjusted, each network is constrained to adapt only to minimize its own error.

FIGS. 5-14 provide a more detailed view of the structure and implementation of a preferred embodiment of the inventive regulator 100.

Although it is conventional to depict and describe neural networks and their elements using the well-known building blocks of analog electronics, it is difficult to implement networks using such hardware components at this time. One problem is that it is difficult to construct artificial neurons which incorporate the back-propagation feature. Another problem is that during the testing and development of a neural network, it is convenient to be able to easily vary the number of elements and arrangement in which they are connected. The need to physically construct arrangements of analog components and their interconnections hinders rapid testing and development of the network. A third problem is that the signal processing required to convert available real-world signals into those which may be used to drive the input stage of a neural network may be substantially more difficult or expensive to perform in the analog domain.

Figure 6:
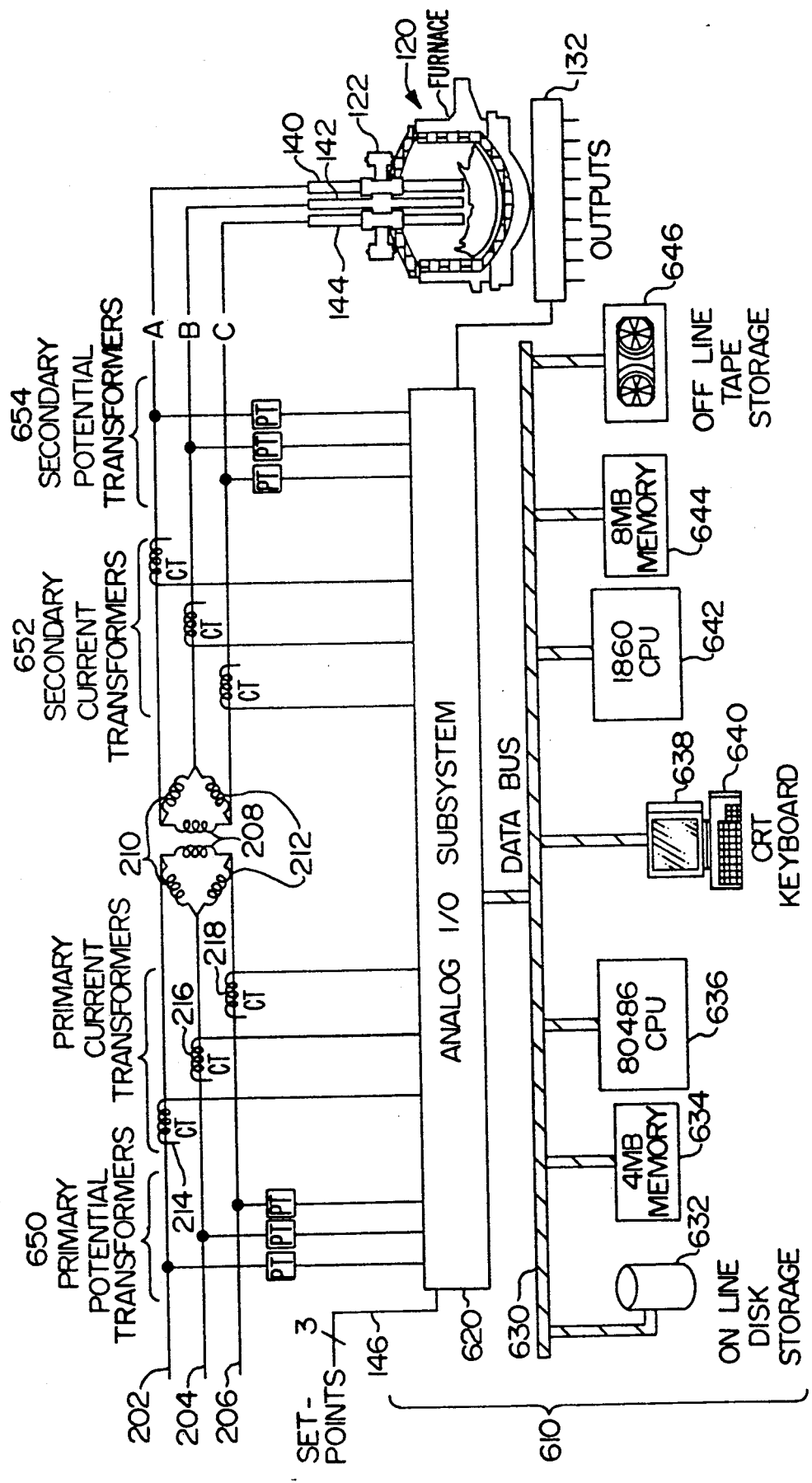
FIG. 6 is a block diagram of a suitable data processing system for implementing the regulator of FIGS. 4-5, shown suitably connected for acquiring operational data from, and controlling, an electric arc furnace.

However, neural networks can be conveniently simulated using a general purpose digital computer running appropriate software. Accordingly, as shown in FIG. 6, a preferred embodiment of the inventive regulator 100 comprises a general purpose digital computer system 610 programmed for the simulation of neural networks 450 and 480. In addition to components typically found in ordinary computer systems, computer 610 also includes suitable ancillary hardware and software 620 for converting analog input signals into a digital format suitable for processing by the networks, and for converting the digital outputs of the networks into appropriate analog output signals for controlling the furnace.

As best seen in FIG. 6, the computer 610 preferably includes a general-purpose central processing unit (CPU) 636, at least 4 megabytes of read-write memory 634 accessible to the CPU 636, a suitable display 638 and keyboard 640 or other facilities for interaction with an operator, a disk storage device 632, and a high capacity tape storage device 646 or the equivalent. In addition, because the simulation of the neural networks and the processing of input data is numerically intensive, computer 610 preferably includes a high-speed super-co-computer 642 and at least 8 megabytes of read-write memory 644 accessible to that co-computer for accelerating numerical calculations. These components are preferably interconnected via a suitable bus 630.

In a practical embodiment of the invention, a type 80486 microprocessor (a product of Intel Corporation, Santa Clara, Calif.) has been selected for use as CPU 636 because it provides adequate performance and is adapted to run commercially-available software products for emulating neural networks. A model 1L860 arithmetic co-computer board (a product of Alacron, Thornwood, N.Y.), containing an i860 arithmetic processor (a product of Intel Corporation, Santa Clara, Calif.), has been selected for use as the super-co-computer 642 because it provides sufficiently rapid performance to implement regulator 100 for real-time control of a furnace. Other processor devices could also be used, if they provide sufficient performance and if appropriate software were written for simulation of the neural networks and for processing of input data.

The analog I/O subsystem 620 receives analog signals representing the present state of the furnace 120 as measured in the power supply circuits feeding the furnace 120. For example, the analog I/O subsystem 620 receives instantaneous voltage measurements on each conductor of the primary circuits from potential transformers 650 and from each conductor of the secondary circuits from potential transformers 654. The analog I/O subsystem 620 also receives instantaneous current measurements through each conductor of the primary circuits from current transformers 214, 216, 218 and through each conductor of the secondary circuits from current transformers 652. In addition, the analog I/O subsystem 620 receives analog signals 146 representing furnace operating set-points from the rule-based set-point optimizer 128 (FIG. 1). Suitable input conditioning networks (not shown), such as voltage dividers and voltage limiters are preferably supplied to condition these signals to levels suitable for input to the analog I/O subsystem 620.

The analog I/O subsystem 620 also provides output signals 134 for controlling the electrode positioning mechanism 122. In applications where the inventive regulator 100 will be used to replace a prior-art furnace regulator 130, it is preferred that the positioning control signals are similar in specification to those provided by existing regulators. For example, positioning control signals 134 may be single-ended analog signals having a maximum voltage swing of +/−15 V. The positioning control signals are preferably converted by an amplifier 132 (FIG. 1) to levels suitable for driving motors or other transducers in the positioning mechanism 122. For example, the amplified drive signals 136 (FIG. 1) provided to the positioning mechanism may supply 10 A over a maximum voltage swing of +/−250 V.

The analog I/O subsystem 620 is preferably constructed from commercially available analog I/O channel equipment compatible with the data bus 630 used in computer 610. In a practical embodiment of the inventive regulator 100, the analog I/0 subsystem provides 16 twelve-bit analog input channels and 4 twelve-bit analog output channels. The analog input channels are provided by one model H-DAS-12 analog input board which is commercially available from Analogic Corp. of Peabody, Mass. The analog output channels are provided by one model DADIO analog output board which is commercially available from Techmar of Cleveland, Ohio. Other suitable analog I/O devices which provide sufficient accuracy and performance could also be used.

In particular, in order to accurately measure certain parameters of AC waveforms, analog input devices capable of collecting at least 4000 samples per second on each channel are probably necessary. An absolute minimum sampling rate, below which the invention will not work, has not been determined. However, in tests conducted using a practical embodiment of the invention, sampling rates below 2,000 samples per second were deemed to introduce enough error to substantially affect performance of the invention. A sampling rate of 4000 samples per second, on the other hand, produced acceptable results, and a sampling rate of 50,000 samples per second resulted in some improvement in accuracy. Greater sampling rates up to 400,000 samples per second were also tested, but did not appear to provide a significant improvement in performance over that obtained at 50,000 samples per second.

Preferably, appropriate software for simulating neural networks is provided for execution by computer 610. A commercial software product which has been found suitable for implementing the regulator 100 is Neuralworks Professional II Plus, which is available from Neuralware of Pittsburgh, Pa. This product allows the user to define a neural network in a convenient form and to test and modify the network as needed, prepares diagrams of the network in a human-readable form, and performs other functions to facilitate the development of neural networks simulated in software which is executable on a conventional digital computer, notwithstanding the fact that the resulting neural network is not limited to conventional binary logic operations. In addition, a software product called Designerpack, also available from Neuralware of Pittsburgh, Pa., can translate the definition of the network into a source program in the well-known "C" programming language. The "C" version of the source program may then be integrated with other programs, modified as necessary, and compiled to produce a program which may be executed on any suitable target computer. In order to implement the inventive regulator 100, the neural network simulation program is preferably integrated with other suitable programs for managing the analog I/O subsystem 620 and for managing the operation of the co-computer 642. The modifications to the neural network simulation program which are needed for operation of the invention are disclosed in the form of source code which is provided as an appendix to this application.

As previously discussed, the regulator 100 includes a Furnace Emulator Neural Network (FENN) 480 and a Regulator Neural Network (RNN) 450. The term "neural network" generally describes a class of information processing systems which use processing elements which model one or more aspects of biological nervous systems. The type of neural network used herein is preferably a fully connected, feed-forward, multi-layer network comprising artificial neurons of the kind described in the references cited above. Such networks will be briefly described here, but readers desiring a more complete description are directed to those references.

Figure 11:
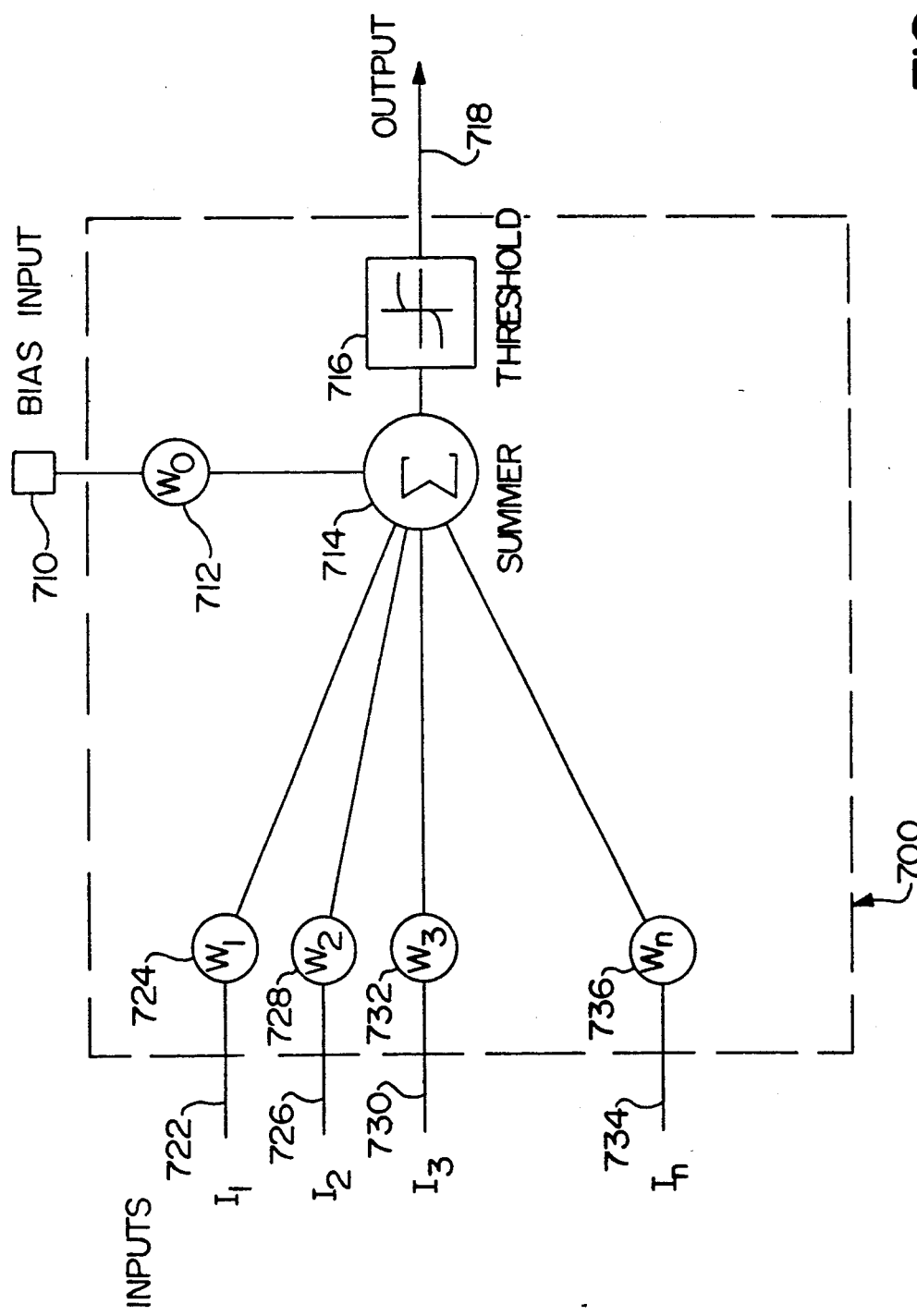
FIG. 11 is an internal block diagram of an individual model neuron element used to implement the neural-network based regulator of FIGS. 4-5.
Figure 12:
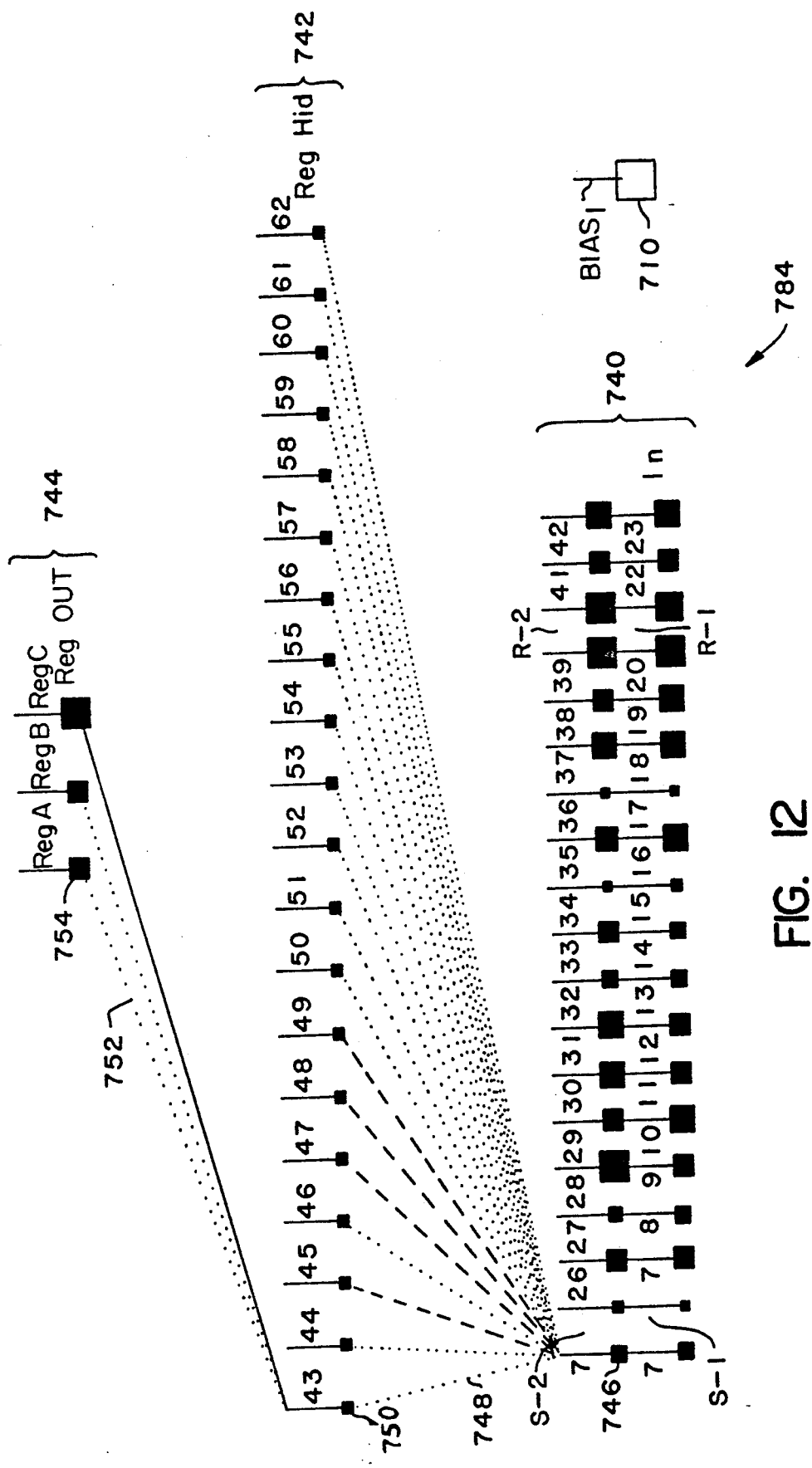
FIG. 12 is a block diagram of the regulator neural network component of the regulator of FIGS. 4-5, shown isolated from other components.
Figure 13:
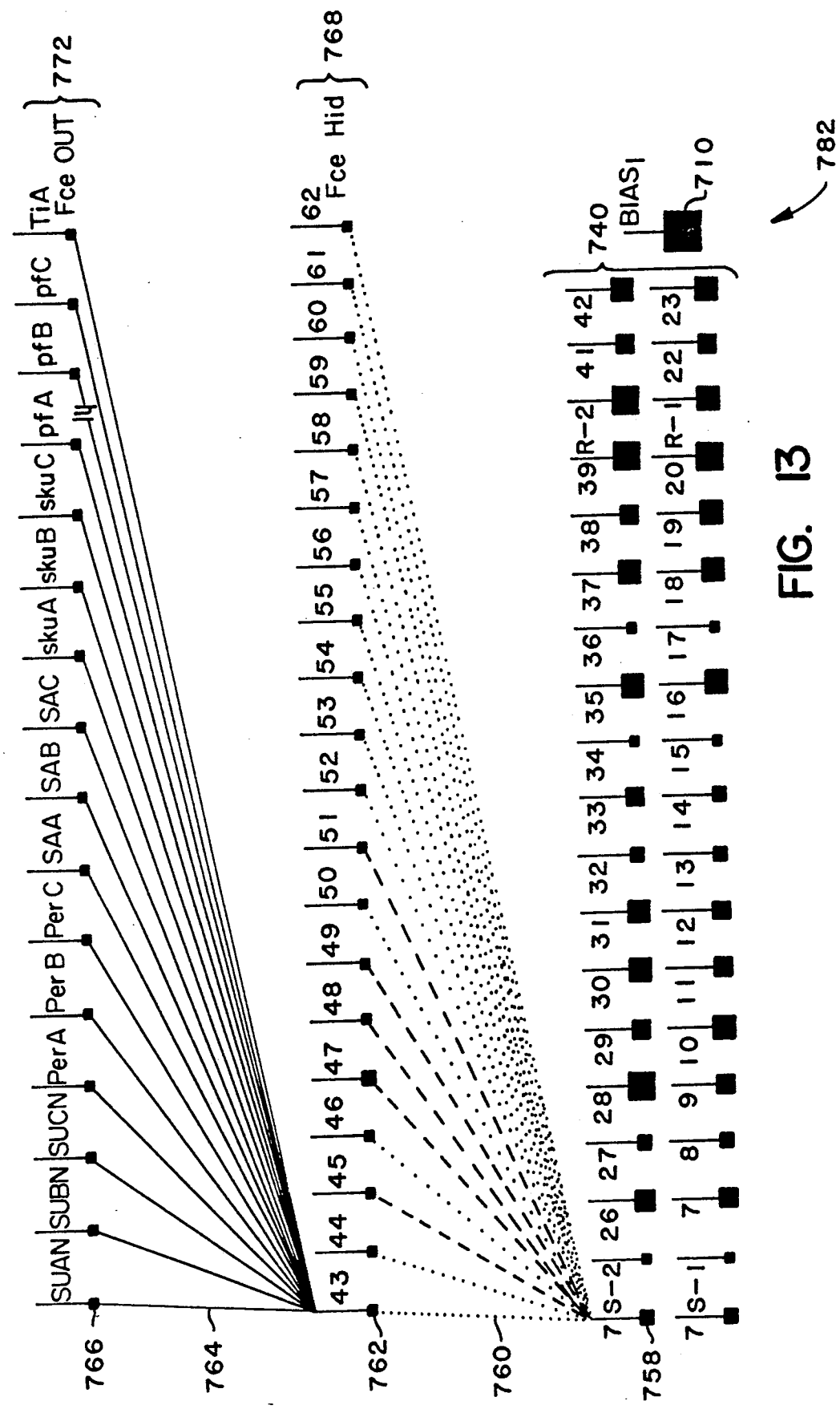
FIG. 13 is a block diagram of the furnace emulator neural network component of the regulator of FIGS. 4-5, shown isolated from other components.
Figure 14:
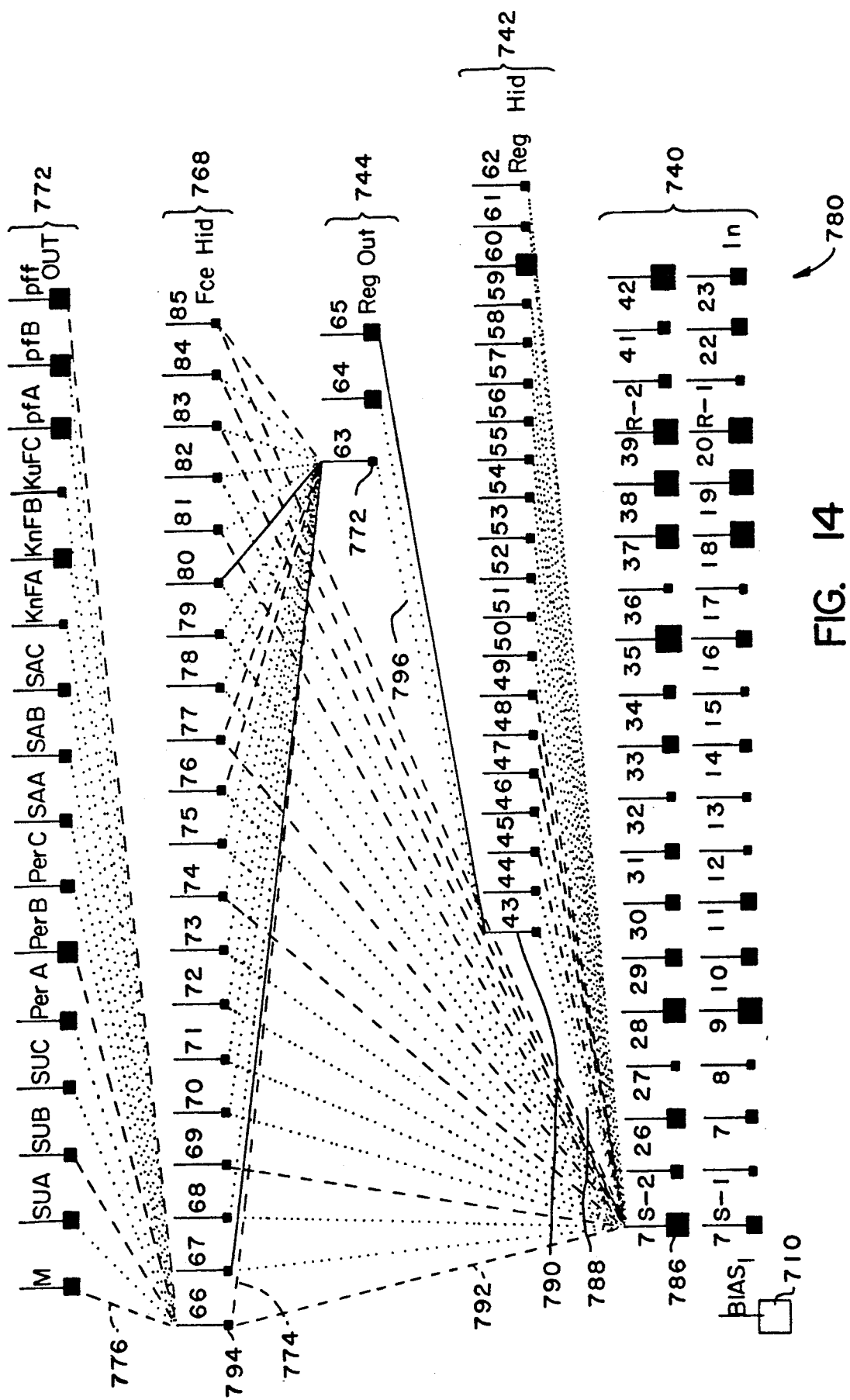
FIG. 14 is a block diagram of the furnace emulator and regulator neural networks operationally interconnected.

FIG. 11 is a diagram of an exemplary individual neuron 700 of the type used to make up the artificial neural networks described herein and shown in FIGS. 12-14. (FIGS. 12-14, which are diagrams of the internal structure of the FENN and RNN in operational and training configurations, will be discussed later.) The neuron 700 comprises a plurality of input lines 722, 726, 730, and 734, a plurality of input "weights" 724, 728, 732, and 736, each associated with a respective one of the input lines, a bias input 710, a bias weight 712, a summer 714, a threshold operator 716 receiving the output of the summer 714, and an output line 718 from the threshold operator which represents the present state of the neuron 700. Although only four input lines and associated weights are shown in FIG. 11, the model neuron 700 may receive an arbitrary number of input lines depending on the particular technology by which the model neuron is implemented. However, by convention, neurons which receive an input from the outside world have only a single input line and associated weight. Each of the input lines 722, 726, 730, and 734 carries an analog signal. The analog signal on each input line is multiplied by its respective weight 724, 728, 732, and 736, and the resulting signals are provided to summer 714.

By convention, a bias input 710 having a constant value representing "1" is supplied to each neuron in a network. The bias weight 712 is adjustable to provide a constant offset to the summer 714. The summer 714 performs an arithmetic addition on the values of the weighted input signals and supplies that signal to threshold operator 716.

The threshold operator 716 applies a suitable transfer function to the result from the summer 714 and presents its output on the output line 718. The threshold operator transfer function may be the sigmoid function or any other suitable function having a step response about zero, or in some networks it may be omitted.

In a computer simulation of a model neuron 710, the weights, the state of each input, and the state of the output may be represented as a numerical value (for example, in a floating-point format), and stored in respective memory locations. In order to simulate the operation of the neuron, each input value would be multiplied by its respective weight, the results would be added and supplied as an argument to the threshold function, and the result would be stored in the memory location assigned to the neuron output. This process would be repeated for each neuron in the network until the simulation has been performed for the entire network. This process is repeated as often and as rapidly as necessary to maintain updated values for the neuron simulations on a real-time basis.

The weights 724, 728, 732, 736 of the various neurons making up a neural network are the "internal parameters" which were mentioned in the discussion of FIG. 4 as being automatically adjusted to minimize error through the process of back-propagation. The automatic adjustment of these weights is the feature of neural networks which permits them to adapt their behavior to match an exemplary reference signal, in effect learning to provide a desired output response from repeated presentations of a given input pattern and the correct or reference response.

A variety of adaptation algorithms are known and would be suitable for use with the inventive regulator 100. The back-propagation algorithm developed by Rumelhart, et al. in the publications cited above is one particular method of applying an error-minimizing adjustment to the weights of neurons distributed throughout a computer-simulated neural network having multiple layers of neurons. A large amount of effort has recently been expended to develop improved algorithms—i.e. algorithms which learn more rapidly or require fewer calculations. The "Extended Delta-Bar-Delta" algorithm is an accelerated version of the back-propagation method which has been tested in a practical embodiment of this invention and has produced good results. It is believed that this is the best algorithm presently available for use in the simulated neural networks of the present invention.

Although this discussion of the regulator 100 refers to its prototype implementation as a neural network simulation on a general-purpose digital computer, other may be preferable for production models. At the present time analog and/or digital electronic hardware components are already available which are especially adapted for the implementation of artificial neural networks, and which enable production of higher performance networks at substantially lower cost than comparable computer-simulated networks. 1 preferred production embodiment of the invention would therefore comprise hardware-implemented neural networks, but would still be integrated with a general-purpose computer for data-acquisition, control, and user-interface functions. Such hardware-implemented neural networks are now realized in the form of semiconductor integrated circuits with small form factors and low power requirements. One known source for such integrated circuits is Neural Semiconductor, Inc. of San Diego, Calif.

Figure 5A:
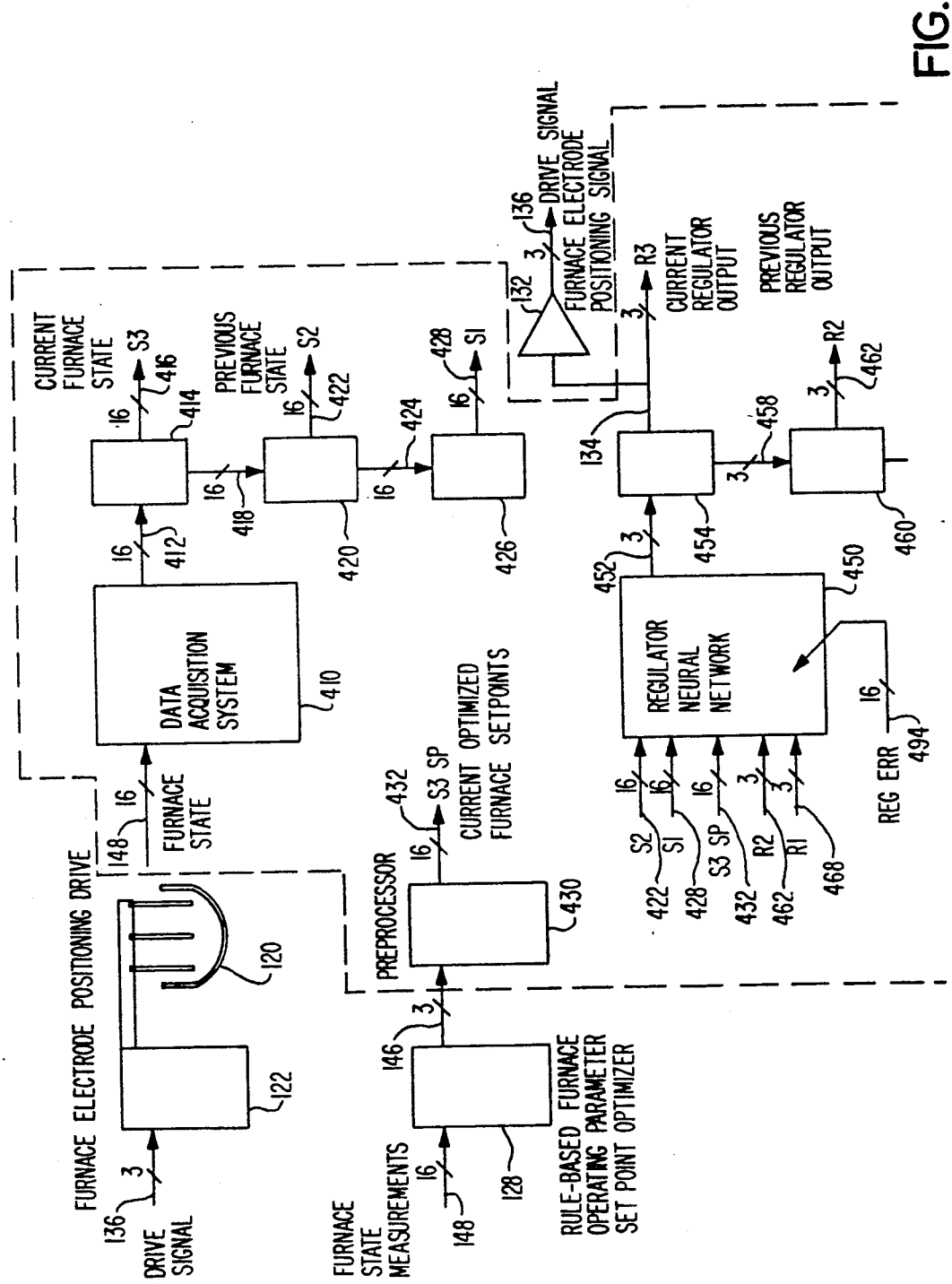
FIG. 5 is a detailed block diagram of the regulator of FIG. 4, shown connected in an operational configuration.
Figure 5B:
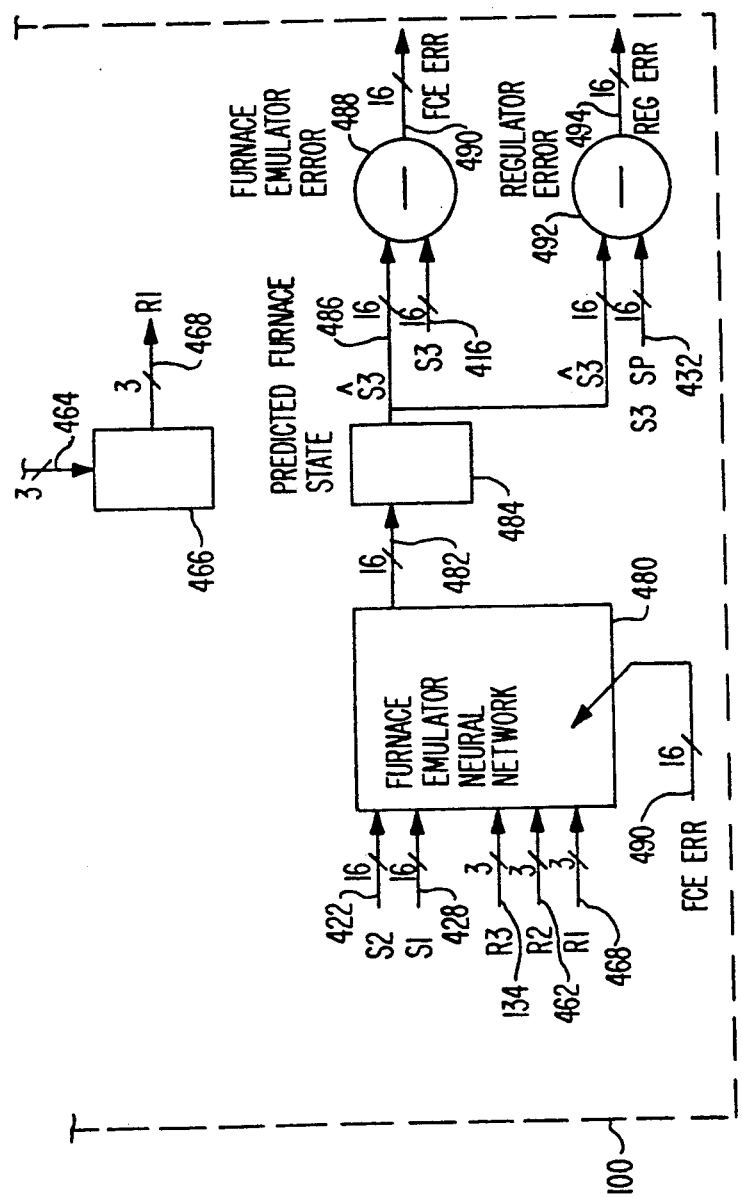

FIG. 5 is a detailed block diagram of the inventive regulator 100. The portion of the diagram enclosed by the dotted line is equivalent to the regulator 100. Information concerning the present operating state of the furnace 120 is supplied to a data acquisition system 410 along a lead 148. Although lead 148 and other similar leads in these drawings appear as single lines, they actually represent cables which carry a group of analog signals collected from the furnace power supply circuits and may include signals representing other data concerning the furnace operating environment. Lead 148 includes at least the instantaneous voltage and current measurements on each conductor of the primary and secondary power distribution circuits as obtained from current and potential transformers 650, 214, 216, 218, 652, and 654 (FIG. 6).

The data acquisition system 410 represents a logical grouping of resources within the computer 610 (FIG. 6) including components of the analog I/O subsystem 620 (FIG. 6) and suitable conventional operating system software such as MS-DOS (not shown). The data acquisition system converts each of the analog signals presented on lead 148 into a twelve-bit digital value. The data acquisition system operates at a predefined sampling rate which may be from 4000 to 50,000 samples per second as previously discussed with respect to the analog I/O subsystem 620. In addition to converting the analog furnace state information into digital form, the data acquisition system 410 also calculates from this information some additional furnace state parameters for use by the FENN 480 and RNN 450.

The data acquisition system 410 presents its output as a furnace state vector on lead 412. The furnace state vector 412 is represented in the drawing as a group or bus of 16 individual signals; but because the preferred embodiment of the regulator is implemented by computer simulation, the state vector is really a group of 16 computer memory locations containing quantities representing the instantaneous value of these signals. If the regulator 100 were implemented using analog hardware, then the furnace state vector 412 would actually be a group of 16 analog signals.

A variety of signals appearing in FIG. 5 will be referred to herein as furnace state vectors (e.g. S3, S2, S1, SP, S3-hat), and each of these vectors contain a common collection of information about furnace operating parameters. 1 furnace state vector may represent actual parameters measured from the furnace 120, or it may represent predicted or desired values. FIG. 7 shows the composition of the furnace state vector. Secondary voltage 810, 812, 814 is an instantaneous value measured from each phase conductor to a common location at the hearth. Secondary current 816, 818, 820 is an instantaneous value measured through each phase conductor.

Primary power factor 822, 824, 826 is calculated conventionally for each phase by dividing power by volt-amperes. In contrast to the practice of the prior art, which employed the power factor of the secondary circuit for this purpose, the power factor of the primary circuit has been found to be an exceptionally valuable parameter for obtaining improved regulator performance. As compared to the secondary power factor, the primary power factor remains stable at substantially lower currents. See FIG. 3. This permits the regulator to operate the furnace with accuracy at those lower currents, so that a higher power factor is achieved, which results in greater energy efficiency.

Designers of prior-art furnace regulators have not used the primary power factor as a regulation parameter. Primary power factor is a difficult parameter to obtain, because its calculation requires a determination of the primary-side equivalent to the secondary "phase-to-neutral" voltage. This voltage is difficult to measure directly, because most arc furnace power supply circuits are connected in the "delta" configuration, and no neutral conductor is available. Even in "wye"-connected power supply circuits, where a neutral conductor is present, phase-to-neutral voltage measurements are highly inaccurate approximations of the equivalent delta-connected phase-to-neutral voltage unless the current in each phase is identical, which condition rarely if ever occurs.

According to the present invention, the primary-side phase-to-neutral voltage is obtained by sampling at a high rate the instantaneous primary phase-to-phase voltage for each pair of phases and calculating therefrom the theoretical phase-to-neutral voltage for each phase:

$$Van = (Vab-Vca)/sqrt(3)$$

$$Vbn = (Vab-Vbc)/sqrt(3)$$

$$Vcn = (Vbc-Vca)/sqrt(3)$$

where Van, Vbn, and Vcn are the phase-to-neutral voltages of phase A, B, and C, respectively, and where Vab, Vbc, and Vca are the phase A to phase B, phase B to phase C, and phase C to phase A voltages, respectively. Because it is necessary to sample the voltage data and perform the above calculations at a relatively high speed, it has only recently become economically feasible to obtain the primary phase-to-neutral voltages using this method in arc furnace regulator applications.

Figure 9A:
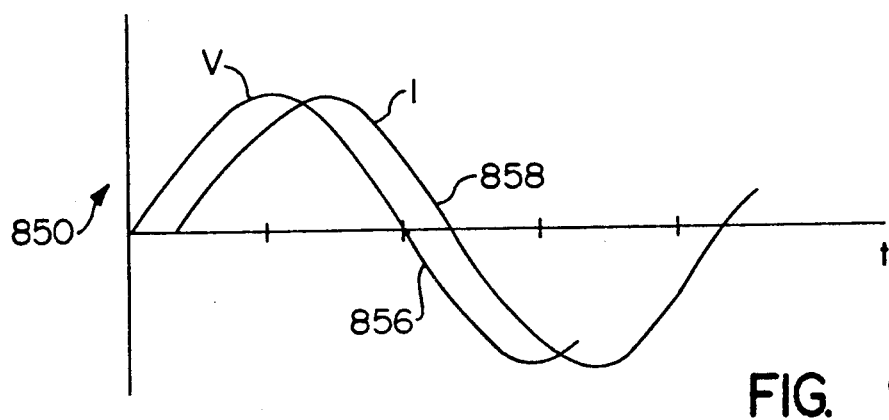
FIG. 9 is a set of graphs depicting the calculation of the "Secondary KW Ratio Factors" appearing in the furnace state vector of FIG. 7, and used in implementing the regulator of FIGS. 4-5.
Figure 9B:
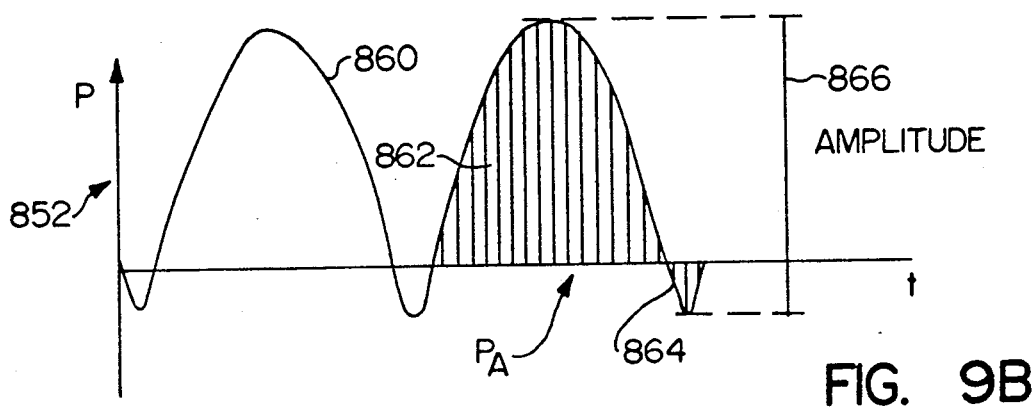
Figure 9C:
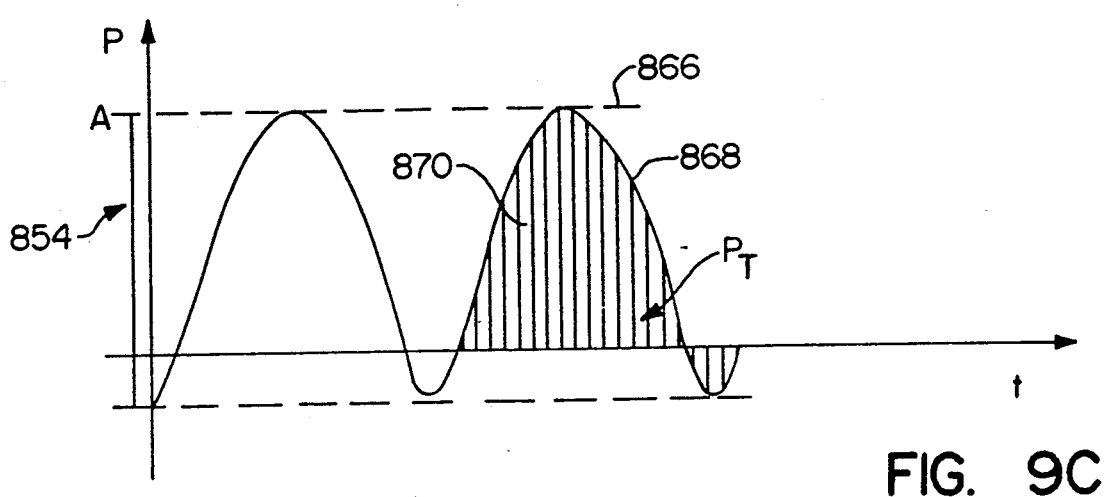

The Persson arc stability factor 828, 830, 832 is calculated for each phase in a manner known to the furnace regulator art. The Secondary KW ratio factor 834, 836, 838 is calculated for each phase, as shown in FIG. 9 and described below. "Time into heat" is a value which varies linearly as the heat progresses, and is provided so that the networks may adapt to vary their response according to the present stage of the manufacturing process.

FIG. 9 is a series of three graphs showing the calculation of the Secondary KW ratio factors 834, 836, 838 which are provided as a part of the furnace state vectors. In graph 850, the voltage 856 and current 858 on a single secondary phase conductor are plotted with respect to time. The current waveform 858 leads the voltage waveform 856 because the secondary circuit predominantly contains inductive reactance. Both waveforms are substantially distorted, owing to jitter in the value of that reactance. In graph 852, instantaneous power 860, calculated as the instantaneous product of current 858 and voltage 856, is plotted with respect to time. A first value Pa is calculated by numerically integrating the areas 862, 864 contained by the instantaneous power waveform 860 over a single cycle of that waveform. A second value 866 is determined by measuring the amplitude of that waveform.

In graph 854, a true sinusoidal waveform 868 having the same amplitude and period 866 of graph 852 is plotted with respect to time. A third value Pt is calculated by integrating the area 870 contained by the power waveform 868 over a single cycle. The KW ratio factor is calculated by dividing Pt by Pa.

The regulator 100 does not, strictly speaking, continuously vary its outputs. Instead, it operates on a cyclical basis, presenting new output values each time a predetermined interval elapses. This predetermined interval is referred to herein as a time slice, and is preferably in the range of 100 to 250 mS. The electromechanical components of the electrode positioning mechanism 122 introduce a response latency of about 100 ms. Accordingly, time slice periods shorter than about 100 mS do not improve regulation because the positioning system cannot respond quickly enough to give effect to the regulator's instructions. Time slice periods longer than 250 mS result in regulator response too sluggish to efficiently control the operation of the furnace 120.

The furnace state 412 produced by the data acquisition system 410 is stored in a buffer 414 and made available to other regulator components as the present furnace state S3 on lead 416. Each time a new furnace state vector S3 on lead 416 becomes available, the previous furnace state is provided to a buffer 420 via lead 418 and is made available as vector S2 on lead 422. Similarly, the old value in buffer 420 is transferred via lead 424 to buffer 426 and made available as vector S1 on lead 428. Accordingly, at any particular time, S3 on lead 416 represents the acquired furnace state for the present time slice (t), S2 on lead 422 represents the furnace state from the previous time slice (t-1), and S1 on lead 428 represents the furnace state from the second previous time slice (t-2). Although this description refers to the storage and use of only two previous values of the furnace state, the use and storage of additional previous values may improve performance of the regulator 100.

Furnace operating set-points from the rule-based set-point optimizer 128 are supplied to the regulator 100 via lead 146. By convention, the operating set-points provided by optimizer 128 have been supplied to prior art regulators 130 as a target current value for each electrode circuit (i.e. "phase amps"). Preprocessor 430 is a conventional device which uses known information about the operation of the particular furnace 120 and characteristics of the power distribution circuit to calculate from these parameters an appropriate set-point value for each of the remaining parameters in the furnace state vector. However, set-point optimizer 128 could provide a more complete specification of operating set-points if desired, eliminating these calculations by preprocessor 430.

Like the data acquisition system 410, the set-point preprocessor 430 represents a logical grouping of resources within the computer 610 (FIG. 6) including components of the analog I/O subsystem 620 (FIG. 6) and suitable operating software (not shown). The preprocessor converts each of the set-point signals presented on lead 146 into a twelve-bit digital value and uses these values to calculate the other appropriate set-points.

A set of present furnace set-points S3 SP is made available to other regulator components on lead 432. In tests of a practical embodiment of the inventive regulator 100, acceptable regulator performance was obtained using a subset of the available set-point parameters consisting of secondary phase-to-hearth voltage, secondary current, and primary power factor. A number of other parameters were tested to determine whether they would be useful as set-points, but their inclusion produced either the same or worse regulator performance. These included the secondary "KW Ratio" factor, primary phase-to-phase voltage, primary phase-to-neutral voltage, primary phase current, secondary power factor, normalized sinusoidal secondary current, normalized sinusoidal primary current, primary "KW Ratio" factor, and audio signals produced by an acoustic microphone. However, it is expected that further testing will indicate that a larger combination of available set-points will ultimately produce optimum regulator performance, and that the combination may even include all available set-points. In general, the neural networks 450, 480 themselves indicate whether a particular parameter provides information useful in regulating the furnace, because the weights associated with such useful parameters rise to a high value during training. Where the networks are unable to find a correlation between use of an input parameter and improved regulator performance, the adaptation algorithm drives the weights associated with that parameter toward zero in order to ignore it.

The regulator neural network 450 receives previous and second previous furnace state vectors S2 on lead 422 and S1 on lead 428, present optimized furnace set-points S3 SP on lead 432, and previous and second previous regulator output state vectors R2 on lead 462 and R1 on lead 468, and produces a present regulator output vector on lead 452. A variety of signals appearing in FIG. 5 will be referred to herein as regulator output state vectors (e.g. R3, R2, R1). Each of these vectors contain the regulator's instructions for raising or lowering the electrodes at a given time. FIG. 8 shows the composition of the regulator output state vector 880. Electrode Up/Down signals 882, 884, 886 represent, for each electrode, the signal used to drive the electrode positioning mechanism 122.

The regulator output vector 452 produced by the RNN 450 is provided to amplifier 132 to convert that signal to levels suitable for driving the transducers in the positioning mechanism 122. In addition, the output vector 452 is stored in a buffer 454 and made available to other regulator components as the present regulator output R3 on lead 134. Each time a regulator output vector R3 on lead 134 becomes available, the previous regulator output is provided to a buffer 460 via lead 458 and is made available as vector R2 on lead 462. Similarly, the old value in buffer 460 is transferred via lead 464 to buffer 466 and made available as vector R1 on lead 468. Accordingly, at any particular time, R3 on lead 134 represents the regulator output for the present time slice (t), R2 462 represents the regulator output from the previous time slice (t-1), and R1 on lead 468 represents the regulator output from the second previous time slice (t-2).

The furnace emulator neural network 480 receives previous and second previous furnace state vectors S2 on lead 422 and S1 on lead 428, and present, previous and second previous regulator output state vectors R3 on lead 134, R2 on lead 462 and R1 on lead 468, and produces a predicted present furnace state vector on lead 482. The predicted present furnace state 482 is stored in a buffer 484 and made available to other regulator components as vector S3-hat on lead 486.

The present predicted furnace state S3-hat on lead 486 is compared with the present actual furnace state S3 on lead 416 at comparator 488 to produce a furnace emulator error vector 490 which is used to adjust the weights of the neurons comprising the FENN 480. The predicted furnace state S3-hat on lead 486 is compared with the present optimized furnace set-points S3 SP on lead 432 at comparator 492 to produce a regulator error vector 494 used to adjust the weights of the neurons comprising the RNN 450. As previously explained, although the error vectors 490, 494 appear in FIGS. 4 and 5 as explicit inputs to the FENN 480 and RNN 450, the information represented in these vectors is actually communicated to the individual neurons making up these networks by means of an appropriate adaptation algorithm, such as the back-propagation method using the extended delta-bar-delta algorithm.

As previously noted, the regulator 100 operates on a cyclical basis, presenting new output values each time a predetermined "time slice" interval elapses. During the brief adjustment interval related to a given time slice, the regulator 100 presents real-world input data collected during the previous time slice to the neural networks 450, the networks produce a revised set of output values, and the RNN 450 and FENN 480 are trained by adjusting their internal parameters.

FIG. 18 shows the details of the activities conducted during an adjustment interval. Events or "mileposts" occurring during the adjustment interval are listed in time order in the left-hand column of the figure. The dark line labelled 310 represents a time slice T-1. The dark line 340 represents the next time slice T. The bracket 302 defines the extent of the adjustment interval between time slices T-1 and T. The bracket 304 defines the extent of the adjustment interval between time slices T and T+1 (not shown). The figure is not intended to provide scale information. A time slice will preferably last several orders of magnitude longer than an adjustment interval.

Each column in FIG. 18 is titled with the name of a "signal" lead shown in FIG. 5. (Note that in the drawings, what appear as signal leads actually represent data stored in a memory location used by the computer simulation of a neural network). The entry in a particular column at a particular row of FIG. 18 indicates the data which is included in the indicated signal (including the particular time slice from which it originated) as a result of the event or milepost associated with that row. An empty entry indicates that the signal carries the same data as the previous entry in that column. An entry containing dashes indicates that the signal is undefined. Bubbles and arrows indicate various dependency relationships among data, as described below. The data encircled by a bubble are required for the preparation of the data to which the associated arrow points. Rectangular boxes indicate that the enclosed data is used to "train" or adjust the internal parameters of the neural network 450 or 480.

Row 312 indicates the data available to the regulator immediately upon the termination of time slice T-1. Row 314 indicates that a short time thereafter, the furnace state data acquired over the previous time slice T-1 (referred to as S(T-1)) becomes available on signal S3 and the operating set-points for the next time slice T (referred to as SP(T)), become available on signal S3 SP. A bubble encircling S(T-1) with its associated arrow indicates that availability of that data is required in order for its later use in training the FENN 480 (row 320). Similarly, a bubble encircling SP(T) indicates that data is required as an input to the RNN 450 (row 326). (Since the dependency relationships identified by the bubble-encircled data are self-explanatory, the remaining relationships will not be discussed in detail.)

In rows 316 and 318, the FENN 480 is operated using previous furnace state and regulator outputs to produce a new "predicted"furnace state for the previous T-1 time slice on signal S3-hat. This result is referred to as S-hat(T-1). In row 320, the FENN 480 is trained--that is, its internal parameters are adjusted—using an error measurement produced by comparing S(T-1) with S-hat(T-1). As previously discussed, the internal parameters of the RNN 450 are held fixed during training of the FENN 480 (rows 316, 318, 320), to avoid altering the parameters of RNN 450 as a result of any error in the operation of FENN.

It may be noted from row 312 that S-hat(T-l) was already available on signal S3-hat. Due to the implementation characteristics of the neural network simulation software used in the preferred embodiment of the invention, it is necessary to conduct an operational "pass" on the network before performing the back-propagation method of adjusting the network's internal parameters. Although S-hat(T-1) was already calculated during the previous work period, it is necessary to operate the FENN 480 once again with identical input data in order to perform training based on the newly acquired furnace state data S(T-1) (row 314), because that data was not yet available when the original calculation of S-hat(T-1) was performed.

In rows 322 and 324, the data in each of the furnace state and regulator output buffers (414, 420, 426, 454, 460, 466; FIG. 5) are shifted respectively to the next buffer assigned to hold "previous" or history data. The data residing in the buffers 426, 456 assigned to hold the oldest history data is discarded. The contents of the buffers assigned to hold the present furnace state and regulator output values are presently undefined.

In rows 326 and 328, the RNN 450 is operated using the new furnace state S(T-1) and set-point SP(T) values obtained in row 314 (along with previous furnace state and regulator outputs) to produce a new regulator output vector on signal R3 for controlling the furnace during the upcoming time slice T. This result is referred to as R(T). In rows 330 and 332, the FENN 480 is operated using the new regulator output R(T) (along with previous furnace state and regulator outputs) to produce a predicted value of the furnace state vector for the upcoming time slice T. This result is referred to as S-hat(T). Note that S-hat(T) takes into account the effect on the furnace of the regulator output R(T) calculated just previously. In row 334, the RNN 450 is trained—that is, its internal parameters are adjusted—using an error measurement produced by comparing SP(T) with S-hat(T). The internal parameters of the FENN 480 are held fixed during training of the RNN 450 (rows 326, 328, 330, 332, 334) to avoid altering the FENN 480 as a result of any error in the operation of RNN 450.

Row 336 indicates the data available to the regulator at the end of, and as a result of, the activities conducted during adjustment interval 302. These data will prevail during the following time slice 340. The events occurring during the next adjustment interval 304 are essentially the same as those which occurred during adjustment interval 302, except that a new set of data becomes available as a result of furnace operation during time slice 340.

FIG. 14 contains a diagram 780 showing the internal structure of the neural networks 450, 480 used in the inventive regulator 100. A set or "layer" of input neurons 740 is shown at the bottom of the diagram. These input neurons may receive either external, real-world signals, such as those representing the measured furnace operating parameters, or signals internally derived, such as buffered, time-delayed versions of previous outputs from the neural networks. These two classes of input signals are treated identically by the input neurons. The networks are shown in their integrated, operational configuration. Both networks 450 and 480 are shown on the same diagram, and inputs common to both networks are shown only once. Each of the input signals shown in FIG. 5 as inputs to networks 450, 480 are directed to the input layer 740. The input layer 740 appears as two rows due to drawing size limitations, but all of the input elements shown are members of the same layer.

A hidden layer 742 of 20 neurons is provided for the RNN 450. A hidden neuron is one which directly receives no external inputs and directly drives no external outputs. Such hidden neurons perform a processing function. An output layer 744 of 3 output neurons produces the three signals which comprise the regulator output state 452 (FIG. 5). Another hidden layer 768 of 20 neurons is provided for the FENN 480. An output layer 772 of 16 output neurons produces the 16 signals which comprise the predicted furnace state 482 (FIG. 5).

Although the hidden layers 742, 768 have been described as having 20 neurons each, some deviation in this number may be acceptable without detracting from performance of the networks. However, a network with too few hidden-layer neurons may be incapable of learning to perform the functions required of the regulator 100. A network with too many hidden-layer neurons may "memorize" too large a number of input and response pairs, and thus be unable to learn general behavioral rules. In addition, an excessive number of hidden-layer neurons will demand greater computational resources when implemented using a digital computer software simulation of the neural networks.

The networks 450, 480 used to implement the regulator 100 may be described as "fully connected." That is, for each neuron in a particular layer, there is a connection to every neuron in the next layer closer to the output layer. In order to avoid obscuring the drawing with the large number of interconnections, however, only the outbound connections from a single neuron in each layer are actually shown. Thus, connections 788 are shown from the output of input neuron 786 to each neuron in the RNN hidden layer 742. In addition, connections 792 are shown from each output of input neuron 786 to each neuron in the FENN hidden layer 768. While not shown, similar connections are also provided from all remaining neurons of input layer 740 to each of the neurons in hidden layers 742, 768.

Connections 796 are provided from neuron 790 of the RNN hidden layer 742 (and all other members of that layer) to each of the neuron in the RNN output layer 744. Because the neurons of the RNN output layer 744 can be considered inputs to the FENN 480, connections 774 are also provided from neuron 772 of the RNN output layer 744 (and all other members of that layer) to each of the neurons in the FENN hidden layer 768. Connections 776 are provided from neuron 794 of FENN hidden layer 768 (and all other members of that layer) to each of the neurons in the FENN output layer 772.

Because the electric arc furnaces which the inventive regulator 100 is designed to control are large, expensive, and dangerous, it is essential that when the regulator 100 is installed to control a furnace 120, its behavior must be nearly correct, even during the first few seconds. It is usually difficult for a designer to predict the processing function each particular neuron will have in an operating neural network. Further, the weights which control the behavior of the neural networks 450, 480 are normally assigned through error minimization during operation of the adaptation algorithm. Therefore, for a network of substantial size, it is virtually impossible for a designer to decide in advance what initial values should be assigned to each of the weights in the network so that its initial behavior is nearly correct.

Figure 15:
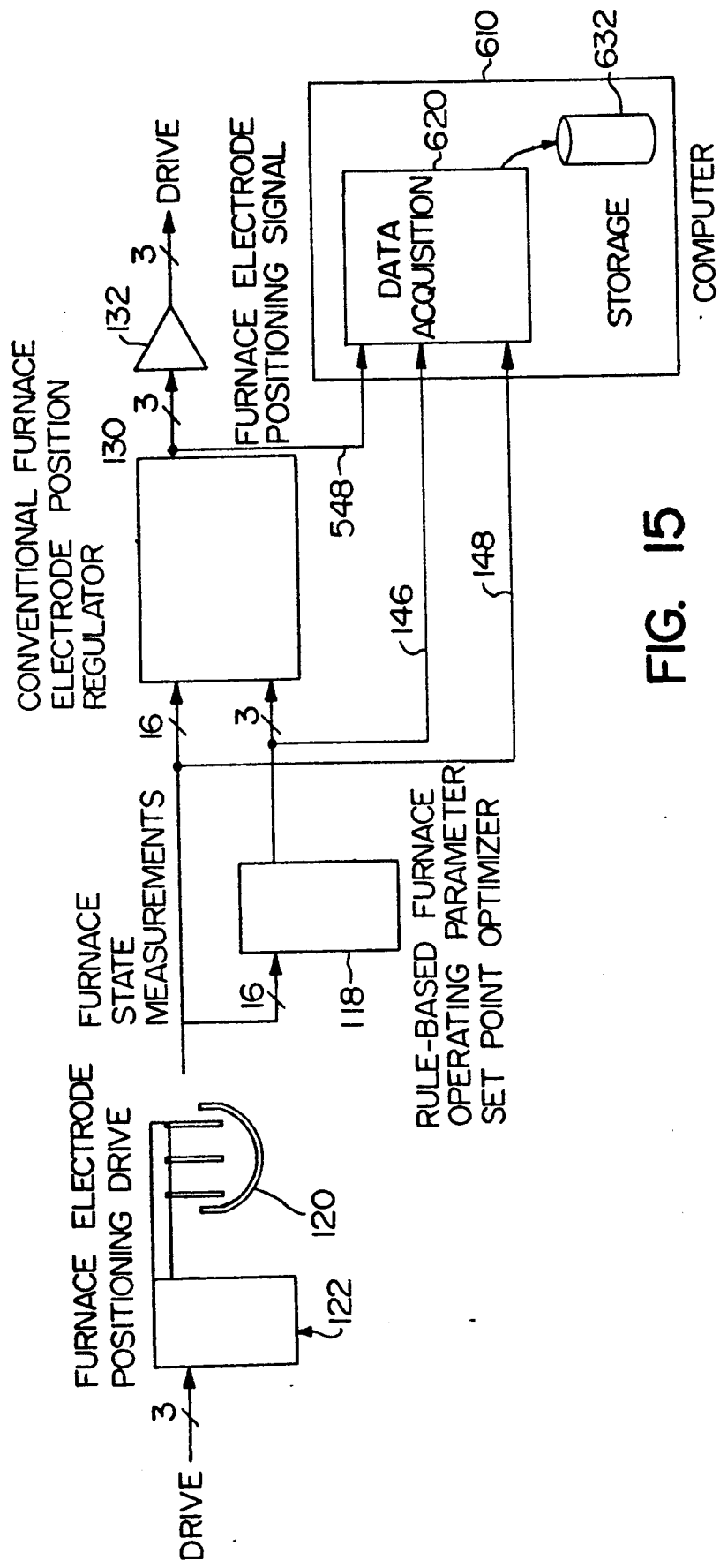
FIG. 15 is a simplified block diagram of a system for training the neural networks of FIGS. 4-5 and 12-14, showing the system connected to an electric arc furnace controlled by a prior art regulator.

Accordingly, before regulator 100 is installed in an operational configuration to regulate a furnace 120, it should first be installed in a modified configuration as shown in FIGS. 12, 13, 15 and 16 so that the neural networks 450, 480 may learn to behave properly. In overview, the furnace 120 is operated normally under the control of a prior-art regulator 130. The RNN 450 is connected and operated in parallel with the prior-art regulator 130 (although the RNN 450 outputs are not connected to control the furnace) so that the RNN 450 may learn to emulate the prior-art regulator 130. In this training mode, the error values used by the adaption algorithm to train the RNN 450 are derived by comparing the output of the RNN 450 to the output of the prior-art regulator 130. The FENN 480 may be similarly connected to learn to emulate the behavior of the furnace 120.

Where the neural networks 450, 480 are implemented by computer simulation, it is not necessary to actually install the regulator 100 for parallel operation during training. Instead, a suitable computer may be installed as shown in FIG. 15 to record the behavior of the prior-art regulator 130 and furnace 120. This computer is installed essentially as described before and shown in FIG. 6, except that the computer must also acquire and record data relating to the behavior of the prior-art regulator 130, as shown by lead 548. Then the stored records, consisting of the inputs to the furnace 120 and the prior-art regulator 130, and their behavior in response thereto, may be presented to the simulated neural networks 450, 480 for training. Once the behavior of the neural networks 450, 480 converges acceptably closely to the behavior of the actual furnace 120 and prior-art regulator 130, the networks are said to be sufficiently "trained"to be installed in the operational configuration. Because each network's behavior is completely defined by the weights in the neurons, once the networks have been trained, the weights may be stored. Then when the regulator 100 is installed in its operational configuration to control furnace 120, the weights may be reloaded into the networks so that they will initially behave in a known and acceptable manner.

Figure 16A:
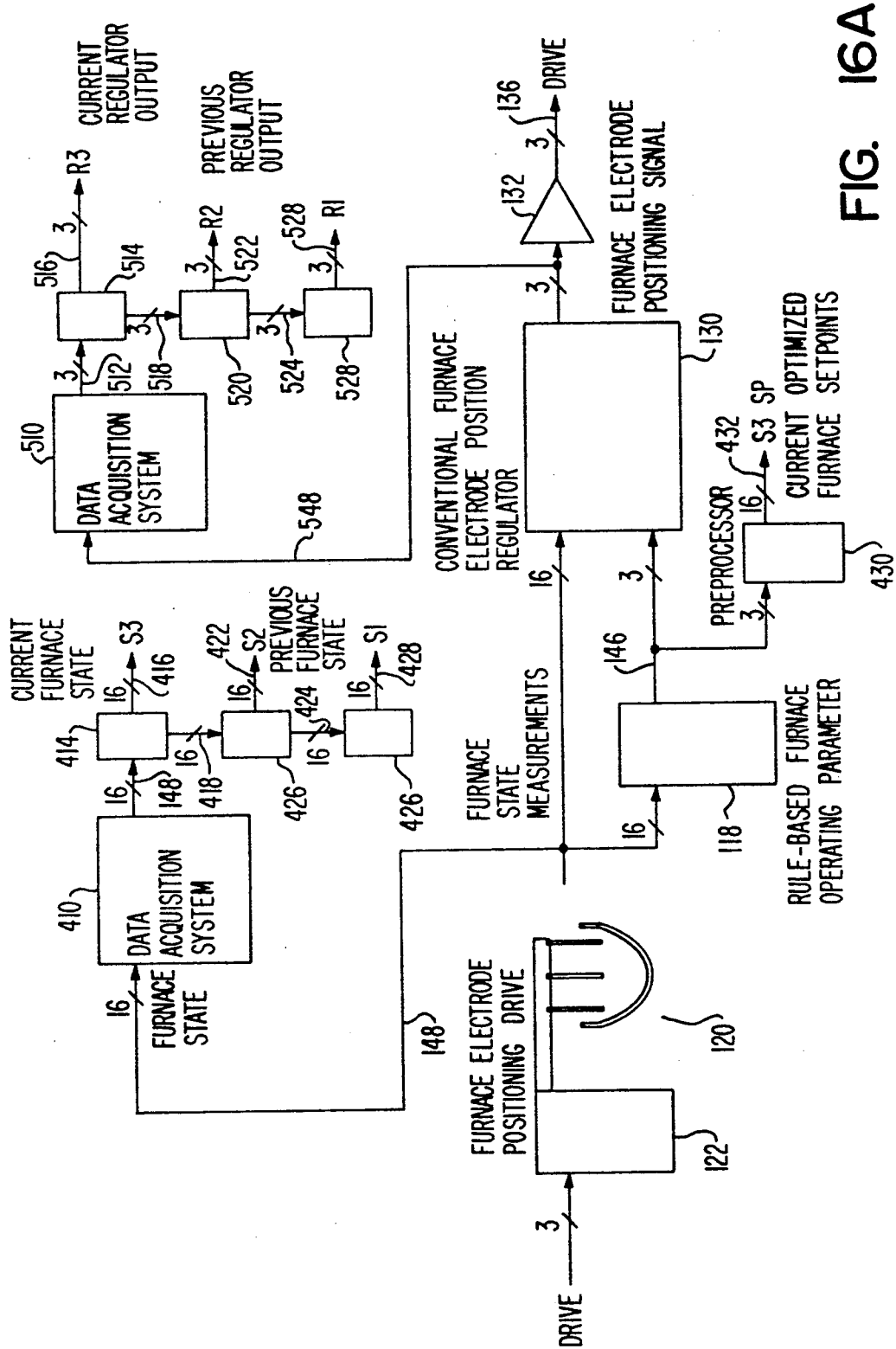
FIG. 16 is a detailed block diagram of a system for training the neural networks of FIGS. 4-5 and 12-14, showing the adaptive regulator connected in a training configuration.
Figure 16B:
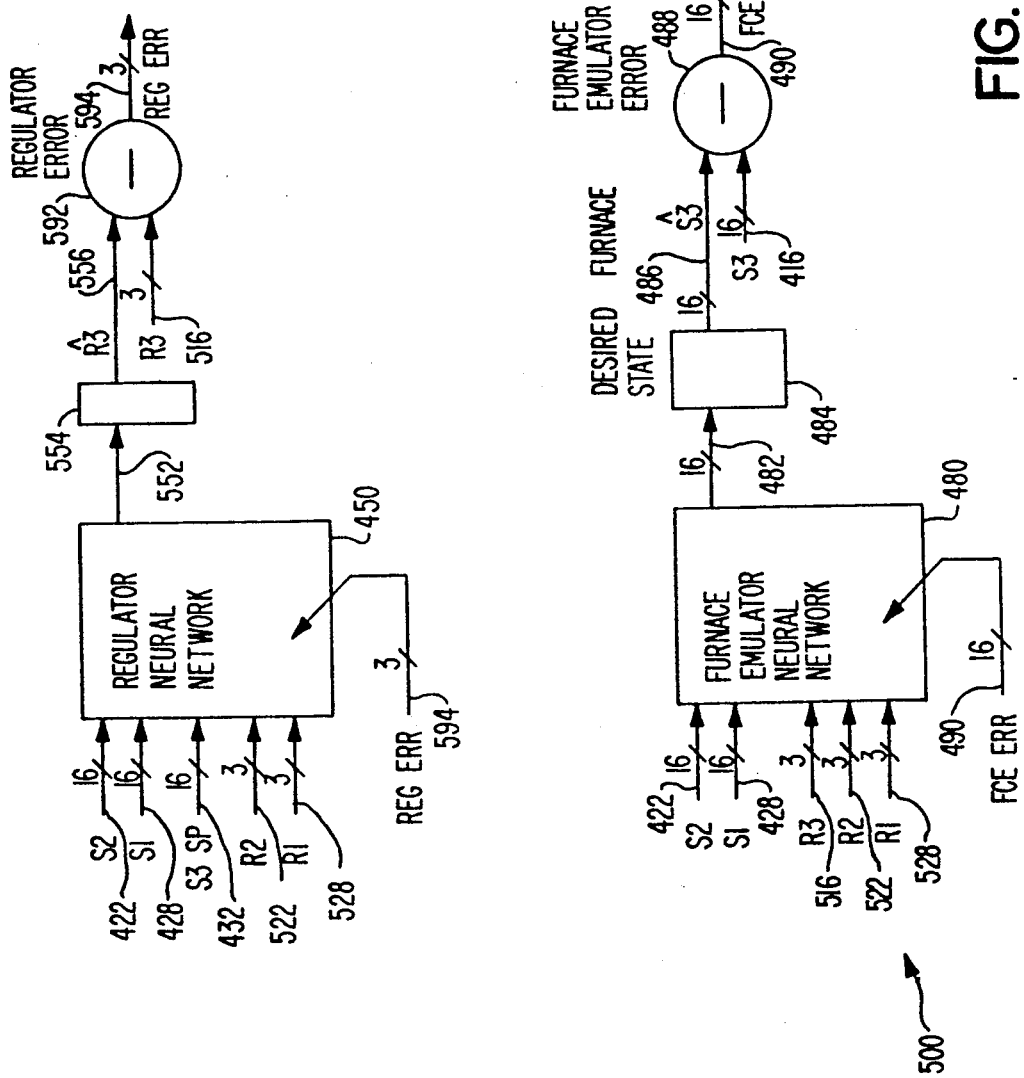

The training configuration 500 of the regulator 100 is shown in greater detail in FIG. 16. Since FIG. 16 is similar to FIG. 5, and since FIG. 5 has been previously described in detail, only those aspects of the training configuration 500 of FIG. 16 which are different from FIG. 5 will be described.

In order to obtain information on the behavior of the prior-art regulator 130, the output of the regulator is provided to a data acquisition system 510 on lead 518. This data acquisition system 510 performs the essentially same functions as the data acquisition system 410 used to collect furnace operating state information, and may be implemented using the same resources. The data acquisition system 510 presents its output as a regulator state vector on lead 512. The regulator state 512 produced by the data acquisition system 510 is stored in a buffer 514 and made available to other regulator components as the present regulator state R3 on lead 516. Each time a new regulator state vector R3 on lead 516 becomes available, the previous regulator state is provided to a buffer 520 via lead 518 and is made available as vector R2 on lead 522. Similarly, the old value in buffer 520 is transferred via lead 524 to buffer 526 and made available as vector R1 on lead 528. Accordingly, at any particular time, R3 on lead 516 represents the acquired regulator state for the present time slice (t), R2 on lead 522 represents the regulator state from the previous time slice (t-1), and R1 on lead 528 represents the regulator state from the second previous time slice (t-2).

In its training mode, the RNN 450 receives the previous and second previous furnace states S2 and S1 on leads 422 and 428, the present set-points S3 SP on lead 432, and the previous and second previous regulator state vectors R2 and R1 on leads 522 and 528. The RNN 450 produces a predicted present regulator state vector on lead 552. The predicted present regulator state 552 is stored in a buffer 554 and made available to other regulator components as vector R3-hat on lead 586.

Since the object of operating the RNN 450 in the training configuration is to enable the RNN 450 to emulate the prior-art regulator, the performance of the RNN 450 in this mode is measured by comparing RNN output R3-hat on lead 556 with the actual regulator output R3 on lead 516. This comparison is performed by comparator 492 to produce a regulator error vector 594 used to adjust the weights of the neurons comprising the RNN 450. The FENN 480 operates essentially identically as described in the discussion of FIG. 5, except that it receives the present, previous and second previous output states (leads 516, 522, and 528) of the actual neural network 130 instead of the state vectors produced by the RNN 450. Although the error vectors 490, 594 appear in FIG. 16 as explicit inputs to the FENN 480 and RNN 450, the information represented in these vectors is actually communicated to the individual neurons making up these networks by means of an appropriate adaptation algorithm, e.g. a back-propagation algorithm such as the extended delta-bar-delta algorithm.

FIG. 12 contains a diagram 784 showing the internal structure of the regulator neural network 450 in its training configuration. FIG. 13 is a diagram 782 showing the internal structure of the furnace emulator neural network 480 in its training configuration. The networks 450, 480 are shown isolated from one another in this configuration because none of the outputs of either network are used as inputs to either network. However, in order for the weights obtained while in the training configuration to be meaningful when the networks are in the operational configuration, the internal structure of the networks in the training configuration must be essentially identical to that in the operational configuration. Accordingly, as shown in FIG. 12, the RNN 450 has an input layer 740, a hidden layer 742 containing 20 neurons, and an output layer 744, which are equivalent to those shown in FIG. 14. Similarly, as shown in FIG. 13, the FENN has an input layer 740, a hidden layer 768 containing 20 neurons, and an output layer 772, which are equivalent to those shown in FIG. 14.

Figure 17:
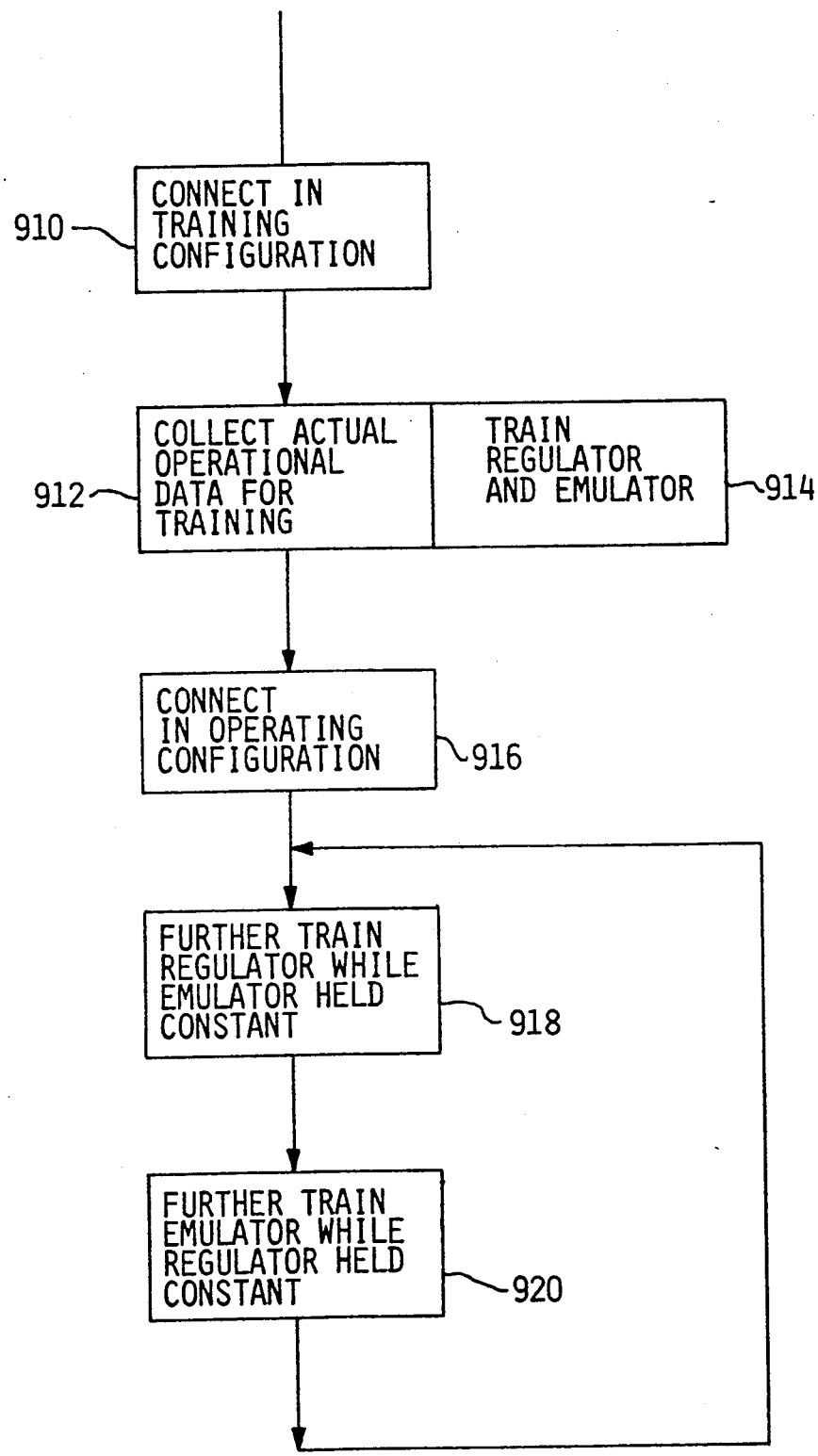
FIG. 17 is a flow diagram showing a method of first training and then operating the adaptive regulator of FIGS. 4-5.

FIG. 17 is a flow diagram showing a sequence of steps in a preferred method of first training and then operating the inventive regulator 100. In step 910, the regulator is connected in a training configuration as shown in FIGS. 15 and 16. In step 912, actual operational data from a furnace 120 operating under control of a prior-art regulator 130 are collected for training purposes. In step 914, the RNN 450 and FENN 480 are trained using data collected in step 912. Steps 912 and 914 are shown as parallel operations, because training of the RNN 450 and FENN 480 may be conducted in parallel with data collection—i.e. with the RNN 450 and FENN 480 on-line. Alternatively, the operational data may be collected first, and the data may then be presented to the RNN 450 and FENN 480 for training at a later time. Once the RNN 450 and FENN 480 have been trained using the furnace 120 and prior-art regulator 130, the inventive regulator 100 may be used to control the furnace 120 without risking initially faulty operation, because after being trained the regulator 100 should work at least as well as the prior-art regulator 130. Thus, in step 916, the inventive regulator 100 is connected to the furnace 120 in an operational configuration. In step 918, during actual operation the RNN 450 is further trained or optimized by adjusting its weights to minimize regulator error while holding the weights of the FENN 480 constant. In step 920, during actual operation the FENN 480 is further trained or optimized by adjusting its weights to minimize furnace emulator error while holding the weights of the RNN 450 constant. Steps 918 and 920 are repetitively performed throughout actual furnace-control operation of the regulator 100.

The above-described embodiment of the invention is merely one example of a way in which the invention may be carried out. Other ways may also be possible, and are within the scope of the following claims defining the invention.

The invention claimed is:

1. In a control system for an electric arc furnace of a type having electrode means, drive means for changing a position of said electrode means, means for obtaining one or more furnace state measurements, means responsive to said furnace state measurements for establishing one or more state measurement set-points for optimizing operation of said furnace, and furnace regulator means responsive to said set-points and said furnace state measurements to use a selected control algorithm to dynamically calculate a change in electrode position for causing said furnace state measurements to more closely approach their respective set-points, and for causing said drive means to move said electrode means accordingly; the improvement wherein:

said regulator means includes means for establishing variable coefficients governing said selected control algorithm;

means for presenting said furnace state measurements and set-points and said variable coefficients as inputs to said regulator means;

said regulator means being arranged to calculate a regulator output as a function of said inputs representing said furnace state measurements, said input representing said set-points and said variable coefficients, and to present said regulator output to said drive means to control the position of said electrode means;

means for comparing said set-points and said regulator output for calculating a regulator error signal;

and means responsive to said regulator error signal for practically continuously modifying said variable coefficients accordingly.

2. In a control system for an electric arc furnace of a type having electrode means, drive means for changing a position of said electrode means, means for obtaining one or more furnace state measurements, means responsive to said furnace state measurements for establishing one or more state measurement set-points for optimizing operation of said furnace, and furnace regulator means responsive to said set-points and said furnace state measurements to calculate a change in electrode position for causing said furnace state measurements to more closely approach their respective set-points, and for causing said drive means to move said electrode means accordingly; the improvement wherein said regulator means comprises:

furnace regulator emulator neural network means having at least one layer and at least one input means, each said layer having at least one neural element, said furnace regulator emulator neural network means also having at least one coupling means for connecting each said neural element to at least one other said neural element or at least one said input means, each said coupling means having a regulator emulator changeable weight controlling a degree of coupling provided thereby;

means for presenting inputs to said furnace regulator emulator neural network means representing said furnace state measurements and said set-points;

said furnace regulator emulator neural network means being arranged to calculate a regulator output as a function of said inputs representing said furnace state measurements, said inputs representing said set-points and said regulator emulator changeable weight, and to present said regulator output to said drive means to control the position of said electrode means;

means for comparing said set-points and said inputs representing said furnace state measurements for calculating a regulator error signal;

and means responsive to said regulator error signal for practically continuously modifying said regulator emulator changeable weight accordingly.

3. In a control system as in claim 2, the further improvement comprising:

clock means for repeatedly obtaining said furnace state measurements and causing said control system to repeatedly recalculate said regulator output and said regulator emulator changeable weight as a function of several of said furnace state measurements obtained at different times.

4. In a control system as in claim 3, the further improvement wherein said means for calculating a regulator error signal comprises:

furnace emulator means for emulating the operation of a furnace;

means for presenting said furnace state measurements, said set-points, sand said regulator output;

said furnace emulator means being arranged to calculate a set of simulated furnace state values as a function of said inputs representing said furnace state measurements, said set-points and said regulator output;

and means for comparing said furnace state measurements and said set-points for calculating said regulator error signal.

5. In a control system as in claim 4, the further improvement wherein:

said furnace emulator means comprises neural network means adapted to emulate a furnace, said neural network means having at least one layer and at least one input means, each said layer having at least one neural element, said neural network means also having at least one coupling means for connecting each said neural element to at least one other said neural element or at least one said input means, each said coupling means having a furnace emulator changeable weight controlling a degree of coupling provided thereby;

means for comparing said furnace state measurements and said simulated furnace state values for calculating a furnace emulator error signal;

and means responsive to said furnace emulator error signal for practically continuously modifying said furnace emulator changeable weight accordingly.

6. In a control system as in claim 5, the improvement further comprising:

clock means for repeatedly obtaining said furnace state measurements and causing said control system to repeatedly recalculate said simulated furnace state values and said furnace emulator changeable weight as a function of several of said furnace state measurements obtained at different times.

7. In a control system as in claim 5, the improvement further comprising:

clock means for repeatedly obtaining said furnace state measurements and causing said control system to repeatedly recalculate said regulator output and said simulated furnace state values as a function of several of said furnace state measurements obtained at different times, thereby producing recalculated values of said regulator output and said simulated furnace state;

and means responsive to said clock means for modifying said regulator emulator changeable weight and said furnace emulator changeable weight in mutually exclusive time periods as functions of said recalculated values, and holding constant said changeable weight of one of said coupling means while modifying said changeable weight of the other of said coupling means.

8. A system for controlling a process, said system comprising:

process emulator means arranged to emulate said process;

a regulator including trainable regulator neural network means arranged to regulate said process;

means for establishing a desired state of said process and presenting said desired state to said regulator neural network means;

said regulator neural network means outputting a process control signal to control said process;

means for presenting said process control signal to said process emulator means;

said process emulator means being arranged to calculate a simulated state of said process as a function of said process control signal;

means for comparing said simulated state with said desired state to derive a process control error signal; and means for training said regulator neural network means as a function of said process control error signal.

9. A process control system as in claim 8, wherein said process emulator means includes trainable process emulator neural network means; and further comprising means for obtaining measurements of a present state of said process, means for presenting said present state measurements and said process control signal to said process emulator neural network means, means for comparing said present state measurements with said simulated state to derive a process emulator error signal; and means for training said process emulator neural network means as a function of said process emulator error signal.

10. A process control system as in claim 8, further comprising: clock means for repeatedly obtaining said present state measurements and causing said control system to repeatedly recalculate said process control error signal and said simulated state as a function of several of said present state measurements obtained at different times, thereby producing recalculated values of said process control error signal and said simulated state; and means responsive to said clock means for training of said regulator neural network means and said process emulator neural network means to occur in mutually exclusive time periods and as functions of said recalculated values.

11. A process control system comprising: at least two trainable neural networks, including a process emulator neural network arranged to emulate a process exhibiting a behavior and a regulator neural network arranged to regulate said process;
   means for obtaining a measurement of a present state of said process and presenting said measurement of the present state of said process to said regulator neural network means;
   means for establishing a desired state of said process;
   said regulator neural network means being arranged to output a process control signal adapted to control said process;
   means for presenting the measurement of the present state of said process and said process control signal to said process emulator neural network means, said process emulator neural network means being arranged to calculate a simulated state of said process as a function of said process control signal;
   means for comparing said simulated state with said desired state to derive a process control error signal;
   means for training said regulator neural network means as a function of said process control error signal;
   means for providing a reference signal representing a state of said process and exemplary of the behavior of said process;
   means for comparing said reference signal with said simulated state to derive a process emulator error signal;
   and means for training said process emulator neural network means as a function of said process emulator error signal.

12. A process control system as in claim 11, further comprising:
   clock means for repeatedly obtaining measurements and causing said control system to repeatedly recalculate said process control error signal and said simulated state as a function of several of said measurements obtained at different times, thereby producing recalculated values of said process control error signal and said simulated state; said regulator neural network and emulator neural network being responsive to said clock means to train of said regulator neural network and emulator neural network to occur in mutually exclusive time periods and as functions of said recalculated values.

13. In a control system for a chaotic process employing at least one regulatable means, means for obtaining at least one present process state measurement, means for establishing at least one state measurement set-point for optimizing operation of said process, and regulator means responsive to said set-point and said present process state measurement to use a selected control algorithm to dynamically calculate a change in a condition of said regulatable means for causing said process state measurement to more closely approach said set-point, and for adjusting said regulatable means accordingly; the improvement wherein:
   said regulator means includes means for establishing variable coefficients governing said selected control algorithm;
   means for presenting said present process state measurement, said coefficients, and said set-point inputs to said regulator means;
   said regulator means is arranged to calculate a regulator output as a function of said outputs representing said present process state measurement, said set-point and said coefficients, and to present said regulator output to adjust said regulatable means;
   means for comparing inputs representing said set-point and inputs representing said process state measurement for calculating a regulator error signal;
   and means responsive to said regulator error signal for practically continuously modifying said coefficients accordingly.

14. In a control system as in claim 13, the further improvement comprising:
   clock means for repeatedly obtaining said process state measurement and causing said control system to repeatedly recalculate said regulator output and said coefficients as a function of several of said process state measurements obtained at different times.

15. In a control system as in claim 13, the further improvement wherein said means for calculating a regulator error signal comprises:
   means for emulating said process;
   means for presenting inputs representing said present process state measurement, said set-point, and said regulator output to said process emulator;
   said means for emulating said process being arranged to calculate a simulated process state value as a function of said inputs representing said present process state measurement and said regulator output;
   and means for comparing said set-point and said simulated input representing said set-point and said simulated process state value for calculating said regulator error signal.

16. In a control system as in claim 15, the further improvement wherein:
   said process emulator means comprises process emulator neural network means for realizing a neural network adapted to emulate a process, said process emulator neural network means having at least one layer and at least one input means, each said layer having at least one neural element, said process emulator neural network means also having at least one coupling means for connecting each said neural element to at least one other said neural element or at least one said input means, each said coupling means having a process emulator changeable weight controlling a degree of coupling provided thereby;

means for comparing said input representing said present process state measurement and said simulated process state value for calculating a process emulator error signal;

and means responsive to said process emulator error signal for practically continuously modifying said process emulator changeable weight accordingly.

17. In a control system as in claim 16, the improvement further comprising:

clock means for repeatedly obtaining said process state measurement and causing said control system to repeatedly recalculate said simulated process state value and said process emulator changeable weight as a function of several of said process state measurements obtained at different times.

18. In a control system as in claim 16, the improvement further comprising:

clock means for repeatedly obtaining said process state measurements and causing said control system to repeatedly recalculate said regulator output and said simulated process state values as a function of several of said process state measurements obtained at different times, thereby producing recalculated values of said regulator output and said simulated process state;

and means responsive to said clock means for modifying said regulator emulator changeable weight and said process emulator changeable weight in mutually exclusive time periods as functions of said recalculated values, and holding constant said changeable weight of one of said coupling means while modifying said changeable weight of the other of said coupling means.

19. In a control system for an electric arc furnace of a type having electrode means, an alternating current power supply for said electrode means including a transformer having primary and secondary windings, drive means for changing the position of said electrode means, means for obtaining at least one present furnace state measurement, means responsive to said furnace state measurement for establishing at least one state measurement set-point for optimizing operation of said furnace, and furnace regulator means responsive to said set-point and said present furnace state measurement to use a selected control algorithm to dynamically calculate a change in electrode position for causing said furnace state measurement to more closely approach said set-point, and for causing said drive means to move said electrode means accordingly; the improvement wherein:

said furnace state measurement means includes means for deriving a measurement of the instantaneous voltage at said primary winding of said power supply transformer;

and means for presenting inputs to said regulator means representing said set-point and said furnace state including at least said derived measurement of the instantaneous voltage at said primary winding;

said regulator means being arranged to calculate a regulator output as a function of said inputs representing said furnace state inputs, and said set-point, and to present said regulator output to said drive means to control the position of said electrode means.

20. A control system as in claim 19 wherein:

said regulator means includes means for establishing modifiable coefficients governing said control algorithm;

and further comprising means for comparing said set-point and said input representing said furnace state for calculating a regulator error signal, and means responsive to said regulator error signal for practically continuously modifying said coefficients accordingly.

21. A control system as in claim 19 wherein said transformer is a three-phase transformer defining a neutral voltage point, said power supply includes three phase conductors connected to said primary winding of said transformer, and said means for deriving a measurement of the instantaneous voltage at said primary winding of said power supply transformer measures the voltage between at least two of said phase conductors.

22. A control system as in claim 21 further comprising means for calculating said derived measurement of the instantaneous voltage at real-time speed, and for presenting a representation thereof as one of said inputs to said regulator means.

23. A control system as in claim 21 wherein said means for deriving a measurement of the instantaneous voltage at said primary winding of said power supply transformer presents at said regulator input representations of the voltages between each of said phase conductors and said neutral point.

24. A control system as in claim 19 wherein said transformer is of a type having three phases and defining a neutral voltage point, said power supply includes three phase conductors connected to said primary winding of said transformer, and said means for deriving a measurement of the instantaneous voltage at said primary winding of said transformer is arranged to determine the voltage between at least one of said phase conductors and said neutral voltage point.

25. A system for controlling a process, said system comprising:

process emulator means arranged to emulate said process;

a regulator including trainable regulator neural network means arranged to regulate said process;

means for establishing a desired state of said process and presenting said desired state to said regulator neural network means;

said regulator neural network means outputting a process control signal to control said process;

means for presenting said process control signal to said process emulator means;

said process emulator means being arranged to calculate a predicted future state of said process as a function of said process control signal;

means for comparing said predicted future state with said desired state to derive a process control error signal;

and means for training said regulator neural network means as a function of said process control error signal.

26. The process control system of claim 25 wherein said process emulator means calculates said predicted state of said process as of a selected future time.

27. The process control system of claim 25 further comprising means for executing process control actions in response to said process control signal from said regulator means;

said means for executing process control actions exhibiting a response time delay between receiving said process control signal and completing execution of said process control actions;

and wherein said process emulator means calculates said predicted state of said process as of a time which is ahead of a present time by an advance interval which is a function of said response time delay.

28. The process control system of claim 27 wherein said advance interval is substantially equal to said response time delay.

29. A process control system as in claim 25, wherein said process emulator means includes trainable process emulator neural network means; and further comprising means for obtaining measurements of a present state of said process, means for presenting said present state measurements and said process control signal to said process emulator neural network means, means for retaining at least one stored predicted future state which was calculated at a previous time, means for comparing said present state measurements with said stored predicted future state to derive a process emulator error signal; and means for training said process emulator neural network means as a function of said process emulator error signal.

30. A process control system as in claim 25, further comprising: clock means for repeatedly obtaining said present state measurements and causing said control system to repeatedly recalculate said process control error signal and said predicted future state as a function of several of said present state measurements obtained at different times, thereby producing recalculated values of said process control error signal and said predicted future state; and means responsive to said clock means for causing the training of said regulator neural network means and said process emulator neural network means to occur in mutually exclusive time periods and as functions of said recalculated values.

* * * * *